(12) United States Patent
Sekiguchi et al.

(10) Patent No.: US 8,401,079 B2
(45) Date of Patent: Mar. 19, 2013

(54) IMAGE CODING APPARATUS, IMAGE CODING METHOD, IMAGE DECODING APPARATUS, IMAGE DECODING METHOD AND COMMUNICATION APPARATUS

(75) Inventors: Shunichi Sekiguchi, Tokyo (JP); Yoshihisa Yamada, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/926,816

(22) Filed: Oct. 29, 2007

(65) Prior Publication Data

US 2008/0063069 A1 Mar. 13, 2008

Related U.S. Application Data

(62) Division of application No. 10/488,229, filed as application No. PCT/JP03/07995 on Jun. 24, 2003, now Pat. No. 8,045,616.

(30) Foreign Application Priority Data

Jul. 15, 2002 (JP) ................................. 2002-205488

(51) Int. Cl.
*H04N 7/12* (2006.01)
*H04N 11/02* (2006.01)
*H04N 11/04* (2006.01)

(52) U.S. Cl. ......... 375/240.16; 375/240.12; 375/240.13; 375/240.14; 375/240.15

(58) Field of Classification Search . 375/240.12–240.17
See application file for complete search history.

(56) References Cited

U.S. PATENT DOCUMENTS

| 5,436,666 | A | * | 7/1995 | Astle | 375/240.16 |
| 5,692,063 | A | * | 11/1997 | Lee et al. | 382/107 |
| 5,754,699 | A | * | 5/1998 | Sugahara | 382/233 |
| 5,812,195 | A | | 9/1998 | Zhang | |
| 6,005,980 | A | * | 12/1999 | Eifrig et al. | 382/236 |

(Continued)

FOREIGN PATENT DOCUMENTS

| CN | 1254113 C | 4/2006 |
| JP | 1-238389 A | 9/1989 |

(Continued)

OTHER PUBLICATIONS

Information Technology—Coding of Audio Visual Objects—Part: 2 Visual, Amendment 1: Visual Extensions, ISO/IEC 14496-2, pp. 202-211, Jan. 31, 2000.

(Continued)

*Primary Examiner* — David Czekaj
*Assistant Examiner* — Chikaodili E Anyikire
(74) *Attorney, Agent, or Firm* — Birch, Stewart, Kolasch & Birch, LLP

(57) ABSTRACT

A moving picture decoding method and a decoder for restoring a moving picture signal is disclosed. The decoder includes a decoding unit that decodes the differential signal, a motion vector, and a shape information indicating a shape of a block that becomes a unit for the motion compensated prediction by using an encoded bitstream. The shape information indicates an accuracy of virtual pixel and an interpolation filtering method. The decoder also includes a motion compensating unit that determines that the accuracy of virtual pixel and the interpolation filtering method is to be used in generating the predicted picture based on the shape of the block that becomes the unit for the motion compensated prediction, and generating the predicted picture containing the virtual pixel with reference to the reference pictures stored in a frame memory using the motion vector decoded by the decoding unit according to a determination result.

4 Claims, 17 Drawing Sheets

U.S. PATENT DOCUMENTS

| | | | |
|---|---|---|---|
| 6,078,694 A | * | 6/2000 | Takahashi et al. ............ 382/238 |
| 6,263,112 B1 | * | 7/2001 | Watanabe et al. ............. 382/236 |
| 6,385,245 B1 | | 5/2002 | De Haan et al. |
| 6,452,971 B1 | * | 9/2002 | Iwasaki et al. ........... 375/240.12 |
| 2001/0005432 A1 | * | 6/2001 | Takahashi et al. ............ 382/243 |
| 2003/0021344 A1 | * | 1/2003 | Panusopone et al. .... 375/240.16 |
| 2004/0175050 A1 | * | 9/2004 | Boon ............................ 382/238 |
| 2010/0135411 A1 | | 6/2010 | Nakaya |

FOREIGN PATENT DOCUMENTS

| | | |
|---|---|---|
| JP | 4-127689 A | 4/1992 |
| JP | 9-154140 A | 6/1997 |
| JP | 11-46364 A | 2/1999 |
| JP | 11-262018 A | 9/1999 |
| JP | 2001-189934 A | 7/2001 |
| TW | 465227 B | 11/2001 |
| WO | WO-03/063503 A1 | 7/2003 |

OTHER PUBLICATIONS

Joint Video Team (JVT), Working Draft No. 2, Revision 2 (WD-2), Jan. 29-Feb. 1, 2002, pp. 1, 41 and 42, Geneva, Switzerland.

Shen et al., "Benefits of Adaptive Motion Accuracy in H.26L Video Coding", Image Processing, 2000. International Conference on Sep. 10-13, 2000, IEEE, vol. 1, pp. 1012-1015, XP010530789; ISBN: 978-0-7803-6297-0.

Ribas-Corbera et al., "Optimizing Motion Vector Accuracy in Block-Based Video Coding", IEEE Transactions on Circuits and Systems for Video Technology, vol. 11, No. 4, Apr. 1, 2001, XP 011014188, ISSN: 1051-8215.

Ribas-Corbera et al., "On the Optimal Motion Vector Accuracy for Block-Based Motion-Compensated Video Coders", Proceedings of the SPIE, vol. 2668, Jan. 1, 1996, pp. 302-314, XP002336827.

Ribas-Corbera et al., "Optimizing Block Size in Motion-Compensated Video Coding", Journal of Electronic Imaging, SPIE / IS & T, vol. 7, No. 1, Jan. 1, 1998, pp. 155-165; XP000732636.

Girod, "Rate Constrained Motion Estimation" Proceedings of the SPIE, SPIE, vol. 2308, No. 2, Jan. 1, 1994, pp. 1026-1034, XP000920557.

Topiwala et al., "Overview and Performance Evaluation of the ITU-T Draft H.26L Video Coding Standard," Proceedings of the SPIE, The International Society for Optical Engineering, Applications of Digital Image Processing XXIV, San Diego, CA, USA, Jul. 31-Aug. 3, 2001, vol. 4472, pp. 290-306.

* cited by examiner

IMAGE CODING APPARATUS, IMAGE CODING METHOD, IMAGE DECODING APPARATUS, IMAGE DECODING METHOD AND COMMUNICATION APPARATUS

This application is a Divisional of application Ser. No. 10/488,229 filed on Mar. 2, 2004 now U.S. Pat. No. 8,045,616, and for which priority is claimed under 35 U.S.C. §120; and this application claims priority of Application No. PCT/JP03/07995 filed on Jun. 24, 2003 under 35 U.S.C. §119; the entire contents of all are hereby incorporated by reference.

FIELD OF THE INVENTION

The present invention relates to an image coding apparatus for and an image coding method of, when encoding a picture with a high degree of efficiency, predicting a picture that should be encoded from an existing picture and encoding a prediction error, and an image decoding apparatus for and an image decoding method of, when encoding or decoding a picture or a coded picture with a high degree of efficiency, predicting a picture that should be reconstructed from an existing picture and decoding a coded picture by adding it to a prediction error. It also relates to a communication apparatus provided with at least one of the image coding apparatus and the image decoding apparatus.

BACKGROUND OF THE INVENTION

An image coding standard, such as MPEG (Moving Picture Experts Group) or ITU-T H.26x, includes the steps of dividing each frame into a plurality of square blocks each of which consists of 16×16 pixels of a luminance signal (contains 8×8 pixels of a chrominance difference signal), which is called a macroblock, estimating a movement with respect to a reference frame by performing a motion compensated prediction for each of the plurality of macroblocks, and coding both a signal (i.e., a predictive residual signal) corresponding to an estimated error and motion vector information. Furthermore, in the case of MPEG-2, there has been provided a technique for dividing each macroblock into two field regions and performing a motion prediction for each of the two field regions. In the case of H.263 and MPEG-4, there has been provided a technique for dividing each macroblock into four 8×8 pixel subblocks and performing a motion prediction for each of the four 8×8 pixel subblocks. Particularly, in the case of MPEG-4, it is known that the adaptation of the size of blocks for motion predictions causes an increase in the amount of coded data about motion vectors, but provides an improvement in the traceability of more-violent and more-fine movements, and it can be expected that an appropriate mode selection provides an improvement in the performance of the image coding method.

Furthermore, the accuracy of motion vectors is provided as another technical aspect of motion compensated predictions. Although digital image data originally have only information about discrete pixels (referred to as integer pixels from here on) generated by sampling, a technique for producing virtual samples to be arranged among integer pixels by performing interpolation calculations, and for using those pixels as a predicted picture is used widely. It is known that this technique provides two advantages of improving the prediction accuracy by producing an increase in the number of candidate points for predictions, and of improving the prediction efficiency by reducing the number of singular points included in the predicted picture according to a filtering effect caused by the interpolation calculations. On the other hand, because it is necessary to improve the accuracy of motion vectors each of which represents the amount of movement as the accuracy of virtual samples is improved, it should be noted that the amount of codes of each motion vector is also increased.

In the case of MPEG-1 and MPEG-2, half pixel prediction that can accept up to ½-pixel accuracy as the accuracy of virtual samples is used. FIG. 1 shows generation of samples having ½-pixel accuracy. In the figure, A, B, C, and D denote integer pixels, respectively, and e, f, g, h, and i denote virtual samples having half-pixel accuracy, which are generated from the integer pixels A to D, respectively.

$e=(A+B)//2$ $f=(C+D)//2$ $g=(A+C)//2$ $h=(B+D)//2$ $i=(A+B+C+D)//4$ (// shows a division with rounding)

When this procedure for generating virtual samples having half-pixel accuracy is applied to a certain block, extra data about integer pixels that are placed outside of the block and are apart from the boundaries of the block by one pixel are needed. This is because it is necessary to calculate virtual samples that are placed outside of the block and are apart from the boundaries (i.e., the end integer pixels) of the block by one half pixel.

In the case of MPEG-4, ¼-pixel accuracy prediction using virtual samples having up to ¼-pixel accuracy is adopted. When using ¼-pixel accuracy prediction, after half-pixel samples are generated, samples having ¼-pixel accuracy are generated by using them. In order to suppress an excessive smoothing when half-pixel samples are generated, frequency components included in an original signal are maintained as much as possible by using a filter having a large number of taps. For example, when using ¼-pixel accuracy prediction according to MPEG-4, a virtual sample a having half-pixel accuracy, which is generated for generation of virtual samples having ¼-pixel accuracy, is generated by using eight pixels that are placed in the vicinity of the virtual sample a as follows. The following equation shows only a process of calculating a horizontal component of the virtual sample a having half-pixel accuracy, and a relationship between the virtual sample a having half-pixel accuracy, which is generated for generation of virtual samples having ¼-pixel accuracy, and the X components $X_{-4}$ to $X_4$ of integer pixels in the following equation is shown in FIG. 2.

$a=(COE_1*X_1+COE_2*X_2+COE_3*X_3+COE_4*X_4+ COE_{-1}*X_{-1}+COE_{-2}*X_{-2}+COE_{-3}*X_{-3}+COE_{-4}*X_{-4})//256$ ($COE_k$ shows a filter coefficient (the sum of all filter coefficients is 256), and // shows a division with rounding) When this procedure for generating virtual samples having ¼-pixel accuracy is applied to a certain block, extra data about integer pixels that are placed outside of the block and are apart from the boundaries of the block by one to four pixels are needed. This is because it is necessary to calculate virtual samples that are placed outside of the block and are apart from the boundaries (i.e., the end integer pixels) of the block by ¼ pixel.

However, a problem is that when calculating virtual samples at the boundaries a target block for prediction, because data about extra pixels that are placed outside of the target block, the number of pixels depending on the number of filter taps, are needed for filtering calculations, the memory bandwidth necessary for generation of a predicted image is increased according to the number of filter taps.

To solve this problem, particularly in ¼-pixel accuracy prediction according to MPEG-4, although a measure for reducing the number of pixels to be newly read, which is required for generating a predicted picture, by mirroring end pixels in the vicinity of the boundaries of a target block for prediction is installed, a natural filtering at the boundaries of the target block for prediction is prevented and the measure is therefore not preferable in view of the coding efficiency.

It is therefore an object of the present invention to provide an image coding apparatus, an image coding method, an image decoding apparatus, and an image decoding method that can improve the coding efficiency while reducing the memory bandwidth even when dividing each image frame, such as a macroblock, into small regions and individually performing a motion compensated prediction on each of the small regions, and a communication apparatus having at least one of the image coding apparatus and the image decoding apparatus.

DISCLOSURE OF THE INVENTION

According to an aspect of the present invention, a moving picture decoder restoring a moving picture signal by using an encoded bitstream where a differential signal between a predicted picture generated by performing a motion compensated prediction on a region-by-region basis each being obtained by dividing each frame of the moving picture signal by a predetermined method and the moving picture signal is compression encoded is disclosed. The decoder includes a frame memory storing a plurality of reference pictures available to generation of the predicted picture; a decoding unit decoding the differential signal, a motion vector, and a shape information indicating a shape of a block that becomes a unit for the motion compensated prediction by using the encoded bitstream, wherein the shape information indicates an accuracy of virtual pixel and an interpolation filtering method; and a motion compensating unit determining that the accuracy of virtual pixel and the interpolation filtering method is to be used in generating the predicted picture based on the shape of the block that becomes the unit for the motion compensated prediction, and generating the predicted picture containing the virtual pixel with reference to the reference pictures stored in the frame memory using the motion vector decoded by the decoding unit according to a determination result, wherein the decoder restores the motion picture signal by adding the differential signal decoded by the decoding unit and the predicted picture generated by the motion compensating unit.

According to a further aspect of the present invention, a moving picture decoding method restoring a moving picture signal by using an encoded bitstream where a differential signal between a predicted picture generated by performing a motion compensated prediction on a region-by-region basis each being obtained by dividing each frame of the moving picture signal by a predetermined method and the moving picture signal is compression encoded is disclosed. The method includes, storing a plurality of reference pictures available to generation of the predicted picture; decoding the differential signal, a motion vector, and a shape information indicating a shape of a block that becomes a unit for the motion compensated prediction by using the encoded bitstream, wherein the shape information indicates an accuracy of virtual pixel and an interpolation filtering method; and determining that the accuracy of virtual pixel and the interpolation filtering method is to be used in generating the predicted picture based on the shape of the block that becomes the unit for the motion compensated prediction, and generating the predicted picture containing the virtual pixel with reference to the reference pictures stored in the frame memory using the decoded motion vector according to a determination result, and restoring the motion picture signal by adding the decoded differential signal and the generated predicted picture.

As a result, the image decoding apparatus in accordance with the present invention can decode coded bitstreams on which compressing and coding is performed with an improved degree of coding efficiency and with the memory bandwidth being reduced.

Particularly, when a player for mainly playing back video images, the player including the image coding apparatus and the image decoding apparatus in accordance with the present invention, is incorporated into a piece of hardware such as a mobile phone or mobile information terminal equipment, a reduction in the memory bandwidth offers a remarkable advantage of simplifying the implementation of image decoding and reducing the electric power consumption of the hardware. While the cost of mounting those image coding and decoding apparatus into a piece of hardware, such as a mobile phone or mobile information terminal equipment, can be reduced, the transmission and recording efficiency of the hardware can be improved.

PREFERRED EMBODIMENTS OF THE INVENTION

In order to explain the present invention in greater detail, the preferred embodiments will be described below with reference to the accompanying figures.

Embodiment 1

In this embodiment 1, an image coding apparatus and an image decoding apparatus each of which has a motion compensated prediction means capable of dividing each of a plurality of frames of a moving image into a plurality of macroblocks and further dividing each macroblock into a plurality of subblocks, and individually performing a motion compensated prediction on each of the plurality of subblocks will be explained. The features of the image coding apparatus and the image decoding apparatus of this embodiment 1 include the following two ones: they can change the accuracy of virtual samples, which are described above when an explanation of the prior art example is given, according to the shape and size of each of regions (i.e., blocks) that is a unit for motion compensated prediction, and they can change a method of coding and decoding motion vectors with the change in the accuracy of virtual samples. The structures of the image coding apparatus and the image decoding apparatus in accordance with this embodiment 1 are shown in FIGS. 3 and 4, respectively.

Figure 3:
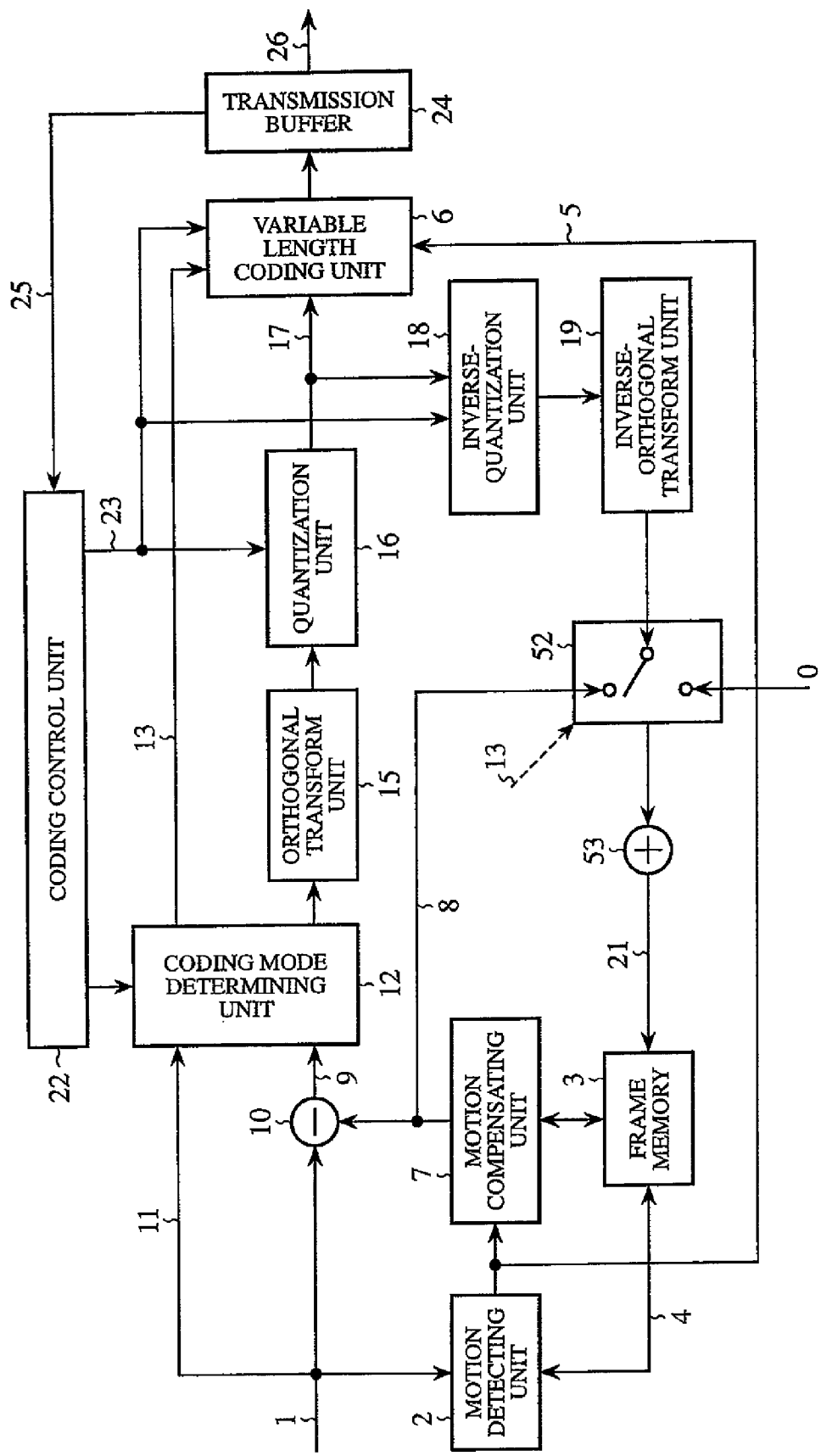
FIG. 3 is a diagram showing the structure of an image coding apparatus in accordance with embodiment 1.
Figure 4:
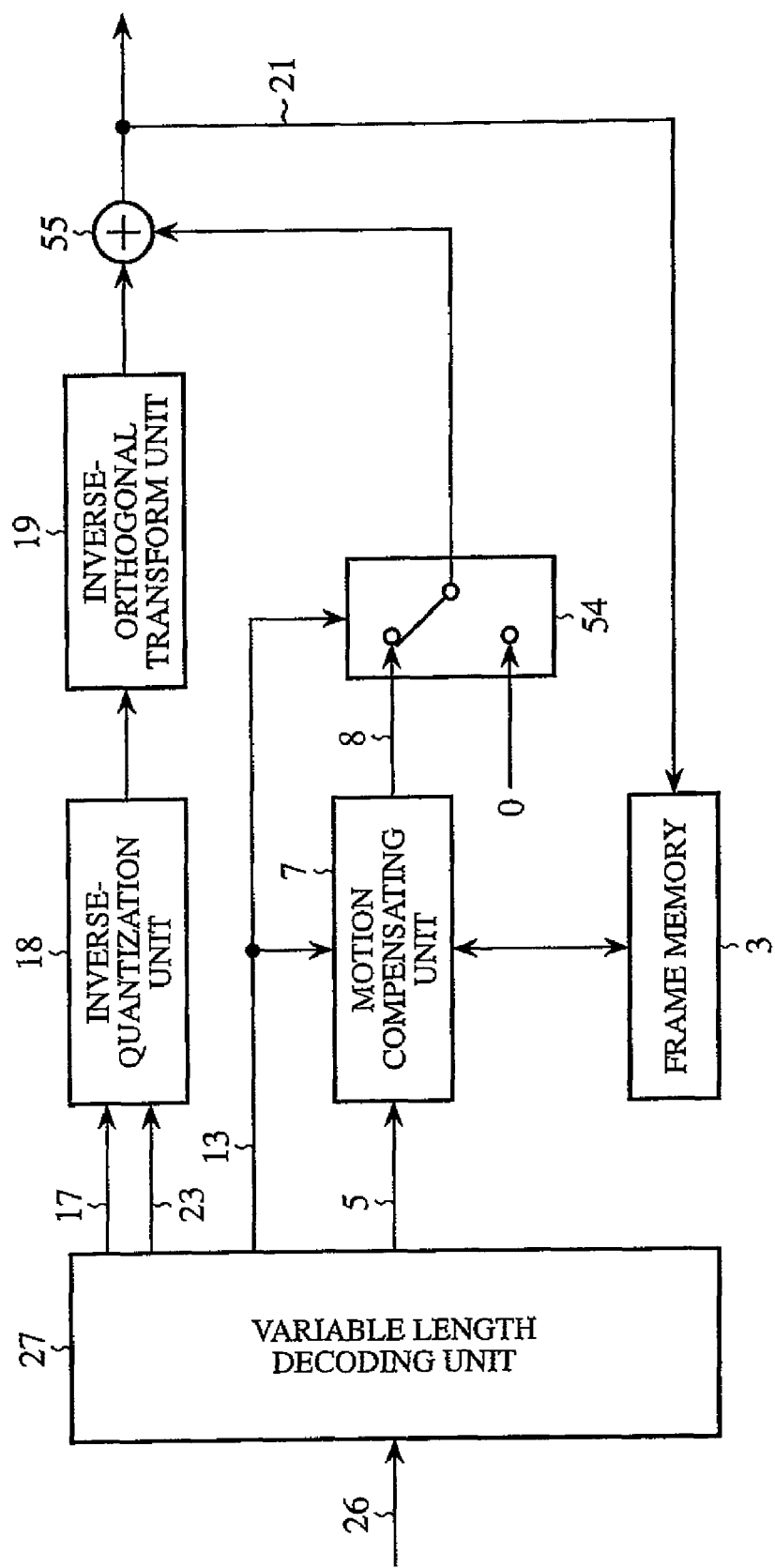
FIG. 4 is a diagram showing the structure of an image decoding apparatus in accordance with embodiment 1.

FIG. 3 shows the structure of the image coding apparatus in accordance with this embodiment 1. As shown in the figure, this image coding apparatus includes a subtractor 10, a coding mode determining unit 12, an orthogonal transform unit 15, a quantization unit 16, a inverse-quantization unit 18, a inverse-orthogonal transform unit 19, a switching unit 52, an adder 53, a frame memory 3, a motion detecting unit 2, a motion compensating unit 7, a variable length coding unit 6, a transmission buffer 24, and a coding control unit 22.

Next, an operation of the image coding apparatus shown in FIG. 3 will be explained.

① General Description of the Operation of the Image Coding Apparatus

Assume that each of frames included in a video image is divided into a plurality of macroblocks and an input video signal 1 is input to the image coding apparatus of FIG. 3 on a macroblock-by-macroblock basis. First of all, the motion detecting unit 2 detects a motion vector 5 for each of the plurality of macroblocks by using a reference picture 4 stored in the frame memory 3. The motion compensating unit 7 acquires a predicted picture 8 based on the detected motion vector 5, and the subtractor 10 acquires a predictive residual signal 9 by calculating a difference between the predicted picture 8 and the input signal 1.

The coding mode determining unit 12 selects a coding mode in which the image coding apparatus can encode a macroblock in question with the highest degree of efficiency from among a plurality of modes each of which specify a certain method of coding the macroblock, such as a motion prediction mode in which the image coding apparatus encodes the predictive residual signal 9, or an intra mode in which the image coding apparatus intraframe or intra-codes the macroblock. The coding mode determining unit 12 then delivers coding mode information 13 indicating the selected coding mode to the variable length coding unit 6 as a piece of target information to be coded. When selecting the motion prediction mode as the coding mode, the coding mode determining unit 12 also furnishes the motion vector 5, as a piece of target information to be coded, to the variable length coding unit 6.

Furthermore, while the target signals to be coded which are selected by the coding mode determining unit 12 are furnished, as orthogonal transform coefficient data 17, to the variable length coding unit 6 by way of the orthogonal transform unit 15 and the quantization unit 16, the orthogonal transform coefficient data 17 are delivered to the switching unit 52 after passed through the inverse-quantization unit 18 and the inverse-orthogonal transform unit 19.

When the coding mode information 13 indicates the motion prediction mode, the switching unit 52 adds the inverse-quantized, inverse-orthogonal-transformed orthogonal transform coefficient data 17 to the predicted picture B from the motion compensating unit 7 according to the coding mode information 13, and then delivers the addition result, as a local decoded picture 21, to the frame memory 3. In contrast, when the coding mode information 13 indicates the intra mode, the switching unit 52 delivers the inverse-quantized, inverse-orthogonal-transformed orthogonal transform coefficient data 17, as the local decoded picture 21, to the frame memory 3, just as it is. The local decoded picture 21 is then stored in the frame memory 3 as reference picture data used for motion predictions of the following frames.

The quantization unit 16 quantizes the orthogonal transform coefficient data with a certain degree of quantization accuracy defined by a quantization step parameter 23 determined by the coding control unit 22. The coding control unit 22 achieves a balance between the coding rate and quality of the output of the image coding apparatus by adjusting the quantization step parameter 23. In general, the coding control unit 22 checks the amount of coded data, which have been stored in the transmission buffer 24 since the variable length coding was carried out and immediately before transmission of the coded data, at regular intervals, and adjusts the quantization step parameter 23 according to a remaining amount 25 of the transmission buffer. Concretely, when the buffer remaining amount 25 is small, for example, the coding control unit 22 reduces the coding rate of the image coding apparatus, whereas when the buffer remaining amount 25 is large enough to store a large amount of data, the coding control unit 22 increases the coding rate and then improves the quality of the output of the image coding apparatus. The quantization step parameter 23 determined by the coding control unit 22 is also delivered to the variable length coding unit 6.

The variable length coding unit 6 entropy-encodes target data to be coded, such as the motion vector 5, the quantization step parameter 23, the coding mode information 13, and the orthogonal transform coefficient data 17, and then transmits the coded results, as compressed image data 26, to the image decoding apparatus by way of the transmission buffer 24.

FIG. 4 shows the structure of the image decoding apparatus in accordance with this embodiment 1. This image decoding apparatus includes a variable-length decoding unit 27, a inverse-quantization unit 18, a inverse-orthogonal transform unit 19, an adder 55, a switching unit 54, a motion compensating unit 7, and a frame memory 3, as shown in FIG. 4.

② General Description of the Operation of the Image Decoding Apparatus

Next, the operation of the image decoding apparatus in accordance with embodiment 1 as shown in FIG. 4 will be explained.

When receiving compressed image data 26 from the image coding apparatus, the image decoding apparatus as shown in FIG. 4 carries out entropy decoding processing described below by using the variable-length decoding unit 27 so as to reconstruct a motion vector 5, coding mode information 13, orthogonal transform coefficient data 17, a quantization step parameter 23, and so on.

The orthogonal transform coefficient data 17 and the quantization step parameter 23 are respectively reconstructed by the inverse-quantization unit 18 and inverse-orthogonal transform unit 19 of the image decoding apparatus, which are the same as those of the coding side equipment.

When the coding mode information 13 indicates the motion prediction mode, the switching unit 54 reconstructs and outputs a predicted picture 8 based on the motion vector 5 and the coding mode information 13 reconstructed by the motion compensating unit 7. In contrast, when the coding mode information 13 indicates the intra mode, the switching unit 54 outputs 0.

The adder 55 then adds the output of the switching unit 54 to a reconstructed signal that is an output of the inverse-orthogonal transform unit 19 so as to acquire a reconstructed picture 21. The reconstructed picture 21 is stored in the frame memory 3 and is then used for generation of predicted pictures of the following frames.

③ Detailed Description of Motion Compensated Predictions

Next, motion compensated prediction processing which is carried out by using the motion detecting unit 2, motion compensating unit 7, and frame memory 3 of the image coding apparatus, and motion compensation processing which is carried out by using the motion compensating unit 7 and frame memory 3 of the image decoding apparatus will be explained.

Figure 5:
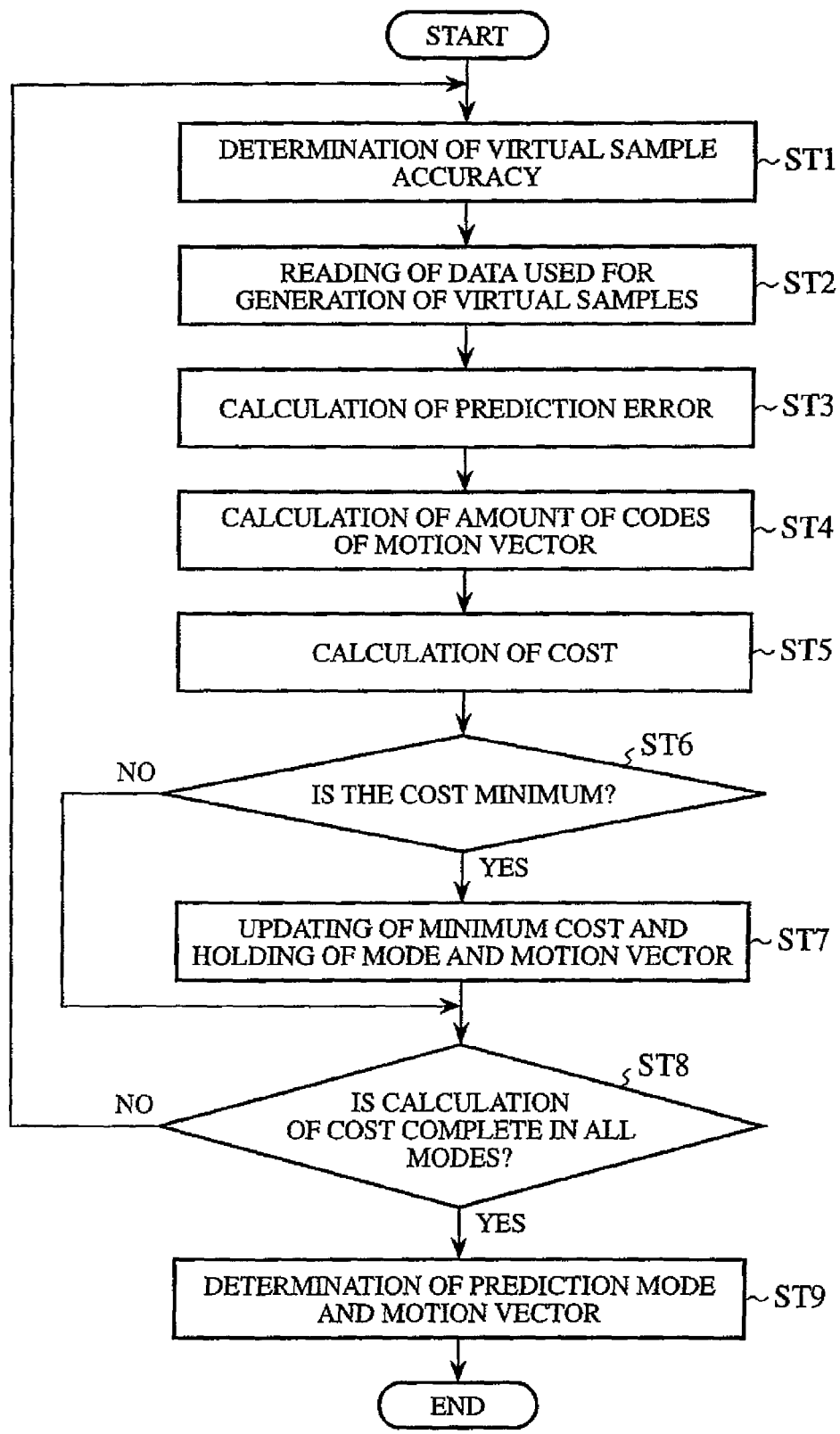
FIG. 5 is a flow chart showing motion compensated prediction processing made by the image coding apparatus in accordance with embodiment 1.

③-1 Motion Compensated Prediction Processing Carried Out by the Image Coding Apparatus FIG. 5 shows a flow chart of the motion compensated prediction processing carried out by the image coding apparatus. Hereafter, the motion compensated prediction processing carried out by the image coding apparatus will be explained step by step.

③-1-1 Determination of Accuracy of Virtual Samples (in Step ST1)

Figure 6:
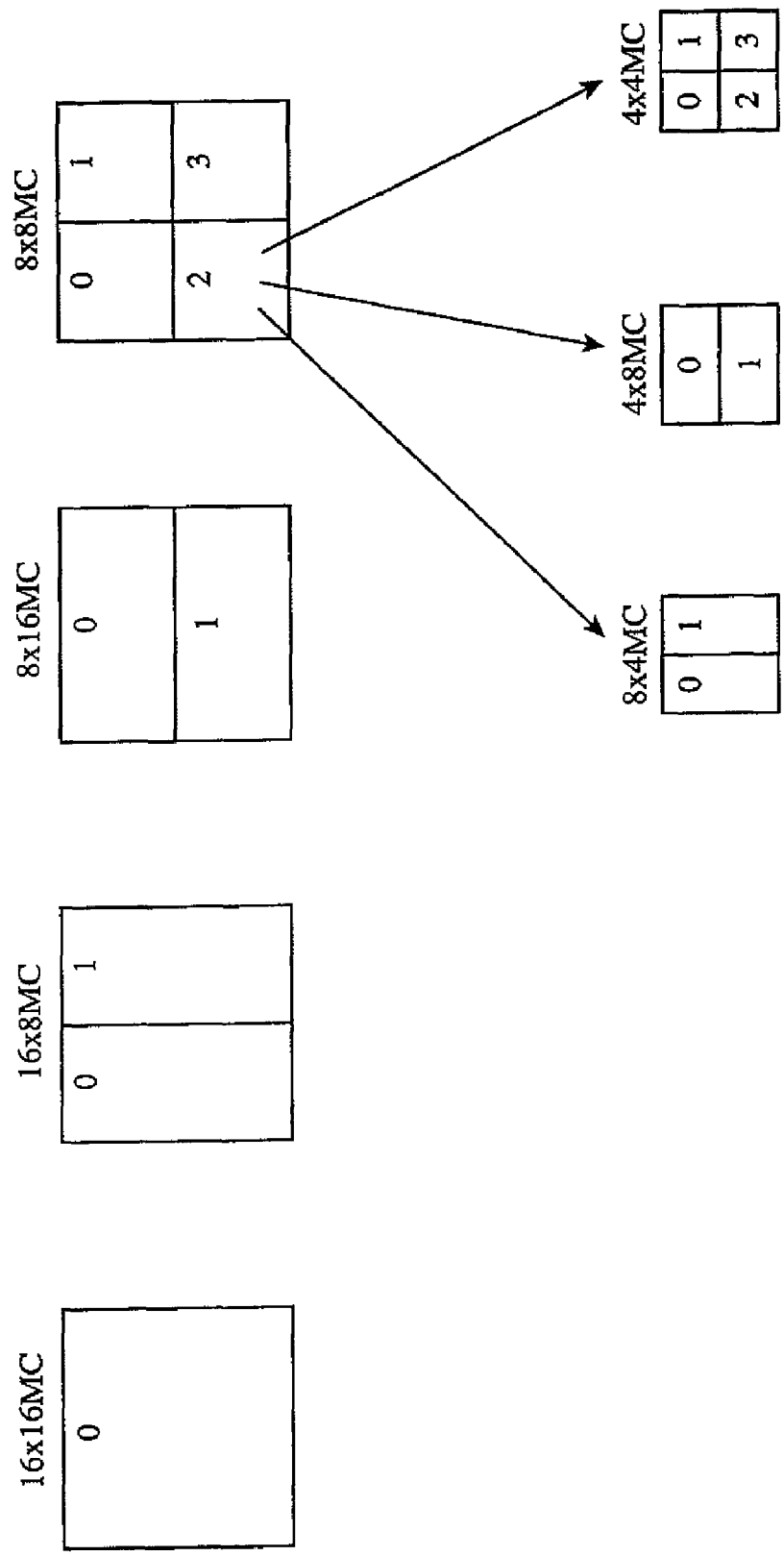
FIG. 6 is a diagram showing the shapes of plural types of motion vector detection unit regions in accordance with embodiment 1.

FIG. 6 shows the shapes of plural types of motion vector detection units in each of which a motion vector is detected by the image coding apparatus in accordance with this embodiment 1. In the figure, 16×16 MC is a motion vector detection unit that is a macroblock, 16×8 MC is another type of motion vector detection unit that is each of two regions into which a macroblock is vertically divided, 8×16 MC is another type of motion vector detection unit that is each of two regions into which a macroblock is horizontally divided, and 8×8 MC is another type of motion vector detection unit that is each of four equal regions into which a macroblock is vertically and horizontally divided. In addition, in accordance with this embodiment 1, each 8×8 MC can be vertically divided into two regions (8×4 MC), horizontally divided into two regions (4×8 MC), or vertically and horizontally divided into four regions (4×4 MC), and each of them can be assumed to be a motion vector detection unit in either case.

This is because in general, when each macroblock can contain an object that makes a complex movement, while subdivision of each macroblock makes it possible to improve the prediction efficiency, the image coding apparatus needs to transmit a lot of pieces of motion vector information to the image decoding apparatus, and the above-mentioned adaptive formation of the various shapes of motion vector detection unit regions within each macroblock makes it possible for the image coding apparatus to carry out coding processing while locally selecting an optimum shape of sub-divided motion vector detection unit regions and detecting a motion vector for each of the sub-divided motion vector detection unit regions.

When detecting a motion vector for each of the sub-divided motion vector detection unit regions, the image coding apparatus of the present invention makes a motion compensated prediction by using virtual samples, as shown in the prior art example. However, unlike prior art standard image coding methods, the image coding apparatus according to this embodiment 1 can locally determine the accuracy of virtual samples and a method of predictively coding the motion vector while associating them with the shape, size, and so on of each of the sub-divided motion vector detection unit regions, as shown in FIG. 6, for example, The image coding apparatus in accordance with this embodiment 1 encodes shape information indicating the shape, size, and so on of each of the sub-divided motion vector detection unit regions, which is a unit for the motion compensated prediction, as a part of the coding mode information 13 indicating that the motion prediction mode is selected, by using the variable length coding unit 6, and then transmits the coded shape information to the image decoding apparatus.

Because based on the shape information included in the coding mode information 13, as part of the coding mode information, indicating that either the motion prediction mode or the intra coding mode is selected, the image decoding apparatus in accordance with this embodiment 1 can determine the shape and size of each motion vector detection unit region that is a unit for the motion compensated prediction, and can uniquely determine the accuracy of virtual samples and a method of predictively coding the motion vector from the shape and size of each motion vector detection unit region, the image decoding apparatus in accordance with this embodiment 1 needs no additional information required for changing both the accuracy of virtual samples and the predictively coding method of predictively coding motion vectors at all.

The image decoding apparatus in accordance with this embodiment 1 uses virtual samples of half-pixel accuracy, as a rule governing the determination of the accuracy of virtual samples and the method of predictively coding motion vectors, for each of motion vector detection unit regions having a smaller size than 8×8 MC regions, for example, blocks of 8×4 size, blocks of 4×8 size and blocks of 4×4 size. On the other hand, the image decoding apparatus in accordance with this embodiment 1 uses virtual samples of ¼-pixel accuracy for each of motion vector detection unit regions having a size equal to or larger than that of 8×8 MC.

The reason why the image decoding apparatus adopts this rule is that the shape of each of motion vector detection unit regions is chosen as follows. In other words, in general, in a region where movements are uniform and movement speeds are slow, the spatial resolution of the screen is maintained and the visibility with respect to textures is improved. It is preferable to make motion vectors uniform as much as possible for such a region by subdividing the region into a plurality of larger motion vector detection unit regions so that the discontinuity among those unit regions according to the subdivision can be prevented and the reproducibility of signals can be improved, and to improve the accuracy of virtual samples in order to improve the prediction efficiency. In contrast, in a region where movements are complex and moving speeds cannot be easily and visually recognized, no detailed texture of the screen is stored and the spatial resolution can be visually recognized as being low. For such a region, it is preferable to increase the number of motion vectors at the expense of the reproducibility of signals to some degree so as to improve the prediction efficiency. However, because the volume of information about each motion vector is increased as the spatial resolution of signals is lowered, it can be assumed that it is acceptable to set the accuracy of virtual samples to low from the viewpoint of the overall coding efficiency.

Figure 7:
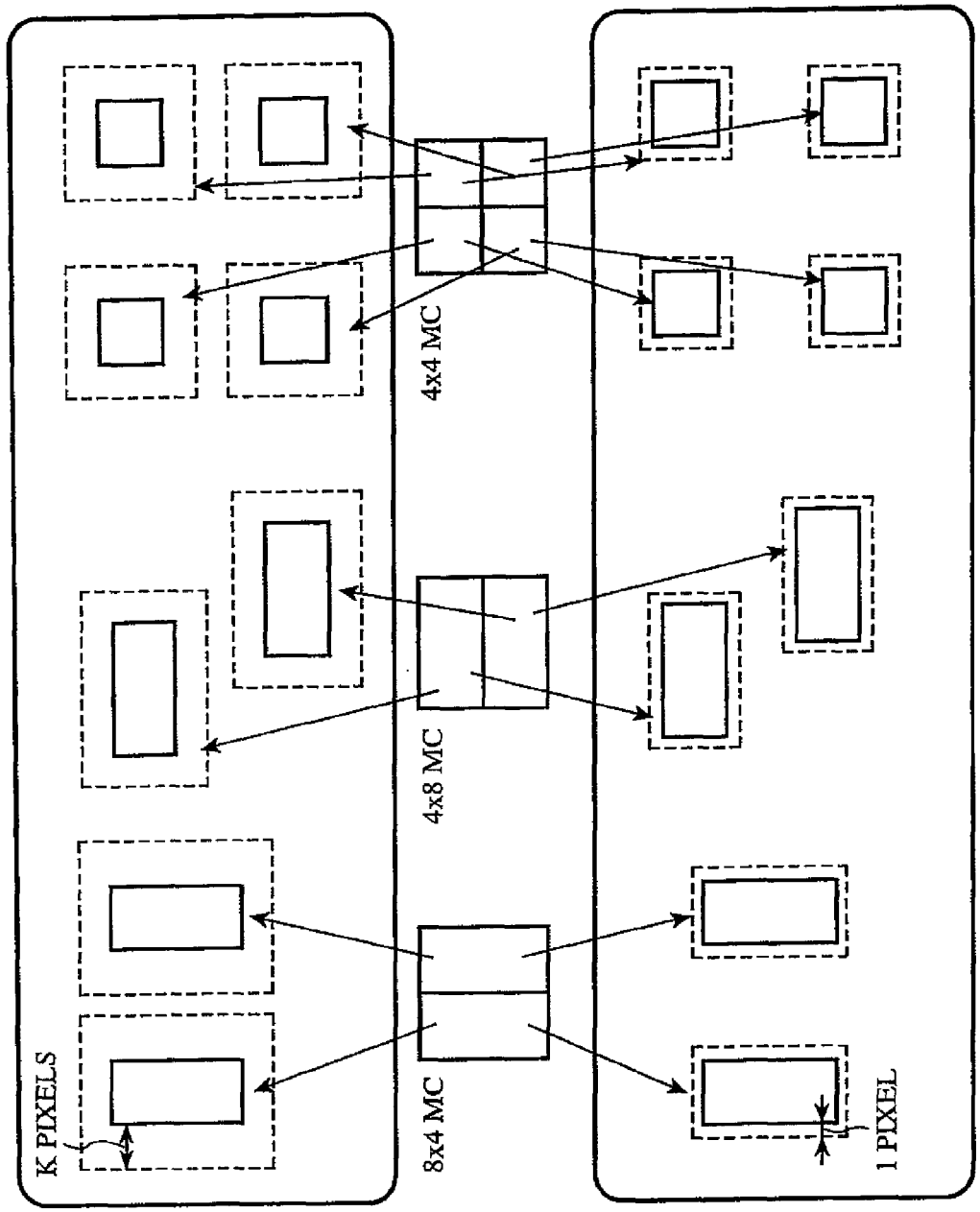
FIG. 7 is a diagram showing that by locally setting the accuracy of virtual samples according to embodiment 1, it is possible to reduce the memory bandwidth required for generating virtual samples for each of 8×4, 4×8, and 4×4 MC modes.

By enabling such a local setting of the accuracy of virtual samples, it is possible to reduce the memory bandwidth required for generating virtual samples for each of 8×4, 4×8, and 4×4 MC modes, as shown in FIG. 7, and therefore the image coding apparatus is effectively simplified. In FIG. 7, the upper row shows that virtual samples of ¼-pixel accuracy are used for all the modes shown in the middle row, and, when a filter having K taps is used to generate virtual samples, integer pixel data about pixels that are placed outside of each target motion vector detection unit region and are apart from the boundaries of each target motion vector detection unit region by 1 to K pixels (K≧2) are read from the frame memory. In accordance with the prior art example mentioned above, one-half of the K pixels is created by using block boundary mirroring. In the case shown in the upper row of FIG. 7, a natural filtering can be implemented by using all the K successive pixels in the vicinity of the boundaries of each target motion vector detection unit region without using the block boundary mirroring.

On the other hand, according to this embodiment 1, in each of 8×4, 4×8, and 4×4 MC modes, it can be predetermined that only virtual samples having half-pixel accuracy are used. In this case, integer pixel data about pixels that are placed outside of each target motion vector detection unit region and are apart from the boundaries of each target motion vector detection unit region by only 1 pixel are all data that need to be read from the frame memory for generation of virtual samples if virtual samples having half-pixel accuracy are generated according to the prior art procedure of generating samples having half-pixel accuracy, for example. In motion vector detection unit regions having a small size, because they are spatially discontinuous, this feature produces an extremely great effect.

③-1-2 Calculation of Amount of Prediction Errors (in Steps ST2 and ST3)

Figure 1:
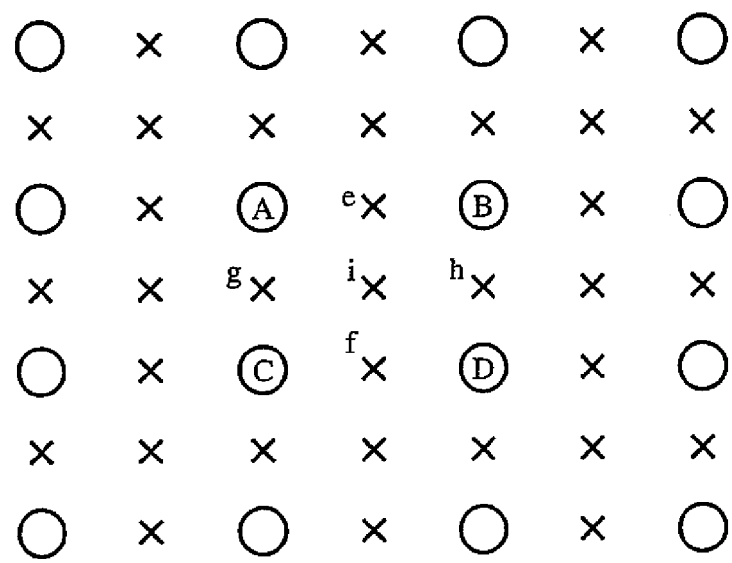
FIG. 1 is a diagram showing generation of samples having ½-pixel accuracy.
Figure 2:
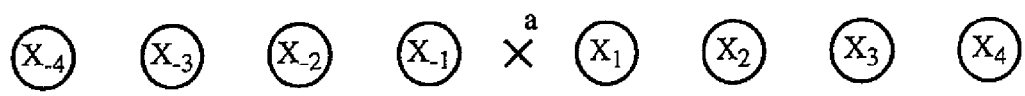
FIG. 2 is a diagram showing a relationship between a virtual sample a having half-pixel accuracy, which is generated for generation of virtual samples having ¼-pixel accuracy, and the X components $X_{-4}$ to $X_4$ of integer pixels, only in a case of horizontal processing.

The image coding apparatus generates a predicted picture for each of candidates for the motion vector of each motion vector detection unit region in each mode according to the virtual sample generation rule determined in step ST1, and calculates the amount of prediction errors by acquiring a difference between the predicted picture and a picture in a motion vector detection unit region to be predicted. Assume that the image coding apparatus generates virtual samples having half-pixel accuracy, as shown in FIG. 1, and virtual samples having ¼ pixel accuracy, as shown in FIG. 2. In the case of this embodiment 1, it is also assumed that the image coding apparatus does not mirror pixels placed in the vicinity of the boundaries of each subblock when generating virtual samples in the vicinity of the end pixels of each subblock as shown in FIG. 2, and the number of filter taps is K for generalizing the following explanation of the motion compensated prediction processing carried out by the image coding apparatus. Therefore, in a mode, such as 8×4, 4×8, 4×4 MC mode or the like, in which a macroblock in question is divided into a plurality of subblocks smaller than 8×8 MC, which use virtual samples of half-pixel accuracy, the image coding apparatus reads pixel data required for generating virtual samples from the frame memory, the pixel data being associated with pixels that are placed outside of each subblock, such as a 8×4, 4×8, or 4×4 motion vector detection unit region, and are apart form the boundaries of each subblock by one pixel, as shown in the lower row of FIG. 7 (in step ST2).

In general, the image coding apparatus calculates the amount of prediction errors by summing the amounts of errors of all pixels included in each subblock or macroblock according to a block matching method (in step ST3). In this case, the image coding apparatus mainly uses a square error $(p-p')^2$ or an absolute difference value $|p-p'|$ as the amount of errors of each pixel, where p is the value of each pixel included in a target picture to be predicted and p' is the value of a corresponding pixel in the predicted picture. In the following explanation, it is assumed that the amount of errors of each pixel is a difference absolute value pp' and a term named SAD (Sum of Absolute Difference) is used as the sum of the amounts of errors in each motion vector detection unit region or each macroblock.

③-1-3 Calculation of the Amount of Codes of the Motion Vector (in Step ST4)

Next, the image coding apparatus calculates the amount of codes of the motion vector (in step ST4). Because the motion vector generally has a strong correlation with adjacent regions, the image coding apparatus defines a motion vector of an adjacent region as a predictor and then variable length encodes a prediction difference (MVD) between the predictor of the motion vector of the adjacent region and the determined motion vector. There are various methods of defining the predictor for the determined motion vector. In accordance with the present invention, it is assumed that the predictor is defined according to a predetermined rule and the prediction difference value (MVD) of the motion vector is acquired based on the predictor, and therefore the detailed explanation of the various methods of defining the predictor for the determined motion vector will be omitted.

In accordance with this embodiment 1, the image coding apparatus takes the virtual sample accuracy determined in ③-1-1 into Consideration when Determining the Amount of Codes of the Prediction Difference Value (MVD).

How the image coding apparatus determines the prediction difference value (MVD) in step ST4 will be explained with reference to FIG. 8. While the motion detecting unit 2 actually carries out this process, the variable length coding unit 6 encodes the motion vector finally determined in step ST9 according to the same rule.

Figure 8:
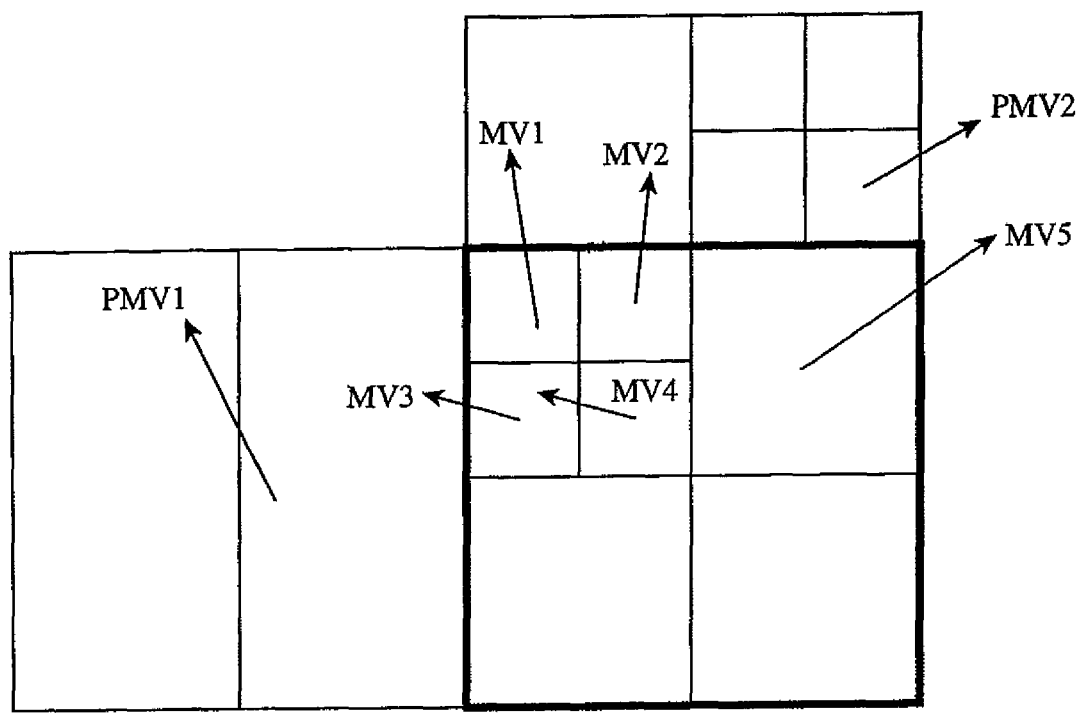
FIG. 8 is a diagram for explaining a method of determining a prediction difference value (MVD) in step ST4.

In FIG. 8, assume that motion vectors MV1 to MV5 are targets to be coded, a predicted vector PMV1 is determined for the motion vectors MV1 and MV3 according to a predetermined predictor defining rule, and another predicted vector PMV2 is determined for the motion vector MV5. It is also assumed that MV1 is a predictor of MV2 and MV3 is a predictor of MV4. Because PMV1 and PMV2 are already-coded vectors, they only have to be cached when necessary.

Because PMV1 is a motion vector in 16×8 MC and MV5 is a motion vector in 8×8 MC, they are motion vectors determined by using virtual samples of ¼-pixel accuracy if they are determined according to the rule determined in ③-1-1. On the other hand, because MV1 to MV4 and PMV2 are motion vectors in 4×4 MC, they are motion vectors determined by using virtual samples of half-pixel accuracy if they are determined according to the rule determined in ③-1-1. In other words, there is a difference in the accuracy of virtual samples between PMV1 and MV5, and MV1 to MV4 and PMV2. On the other hand, when coding each of the motion vectors, the values of the predicted vectors and the accuracy of virtual samples are already known. By using this fact, the image coding apparatus in accordance with this embodiment adaptively sets the accuracy of motion vectors in order to acquire the prediction difference value (MVD). In other words, the image coding apparatus determines the prediction difference value (MVD) under the following conditions.

(1) Condition 1: when the motion vector in question (MV) is the one acquired by a prediction using virtual samples of ½-pixel accuracy, the condition 1 is divided into the following two conditions according to the accuracy of PMV.

Condition 1-1: when PMV is a motion vector that uses virtual samples of the same accuracy, i.e., ½-pixel accuracy, $$MVD=MV-PMV$$

Condition 1-2: when PMV is a motion vector that uses virtual samples of ¼-pixel accuracy, $$MVD=MV-(PMV>>1)$$

(2) Condition 2: when the motion vector in question (MV) is the one acquired by a prediction using virtual samples of ¼-pixel accuracy, the condition 2 is divided into the following two conditions according to the accuracy of PMV.

Condition 2-1: when PMV is a motion vector that uses virtual samples of the same accuracy, i.e., ¼-pixel accuracy, $$MVD=MV-PMV$$

Condition 2-2: when PMV is a motion vector that uses virtual samples of ½-pixel accuracy, MVD=MV−(PMV<<1), where x<<y shows a leftward y-bit shift calculation on x, and x>>y shows a rightward y-bit shift calculation on x.

The above-mentioned condition 1-2 is applied as a rule defining a relationship between PMV1, and MV1 and MV3, the above-mentioned condition 1-1 is applied as a rule defining a relationship between MV1 and MV3, and MV2 and MV4, and the above-mentioned condition 2-2 is applied as a rule defining a relationship between PMV2 and MV5.

The image coding apparatus can calculate MVD with half-pixel accuracy for motion vectors having half-pixel accuracy according to this procedure. Thus the image coding apparatus can reduce the amount of codes of each motion vector as compared with the case where MVDs having ¼-pixel accuracy are always used.

③-1-4 Calculation of Cost and Updating of Minimum Cost (in Steps ST5, ST6, and ST7)

The image coding apparatus acquires the amount of codes $R_{MVD}$ by coding the prediction difference value (MVD) acquired in the above-mentioned step. The image coding apparatus then determines the cost C of each of the candidates for the motion vector by using $R_{MVD}$ and SAD determined in step ST2 according to the following equation (in step ST5).

$$C=SAD_{MV}+\lambda R_{MVD}$$

(λ is a positive constant)

Every time when calculating the cost, as previously mentioned, the motion compensating unit 7 determines whether or not the calculated cost is minimum (in step ST6). The motion compensating unit 7 updates a minimum cost if the calculated cost is smaller than the minimum cost in a previously-selected prediction mode (i.e., if "Y" in step ST6), and holds the corresponding prediction mode and the motion vector data (in step ST7).

The image coding apparatus carries out the processes of steps ST1 to ST7 in 16×16 MC to 8×8 MC modes and in all other modes in which a macroblock is divided into subblocks smaller than 8×8 MC. The image coding apparatus carries out the processes of steps ST2 to ST5 for each of all candidates for the motion vector in a predetermined motion vector searching range that is predefined within each motion vector detection unit by the image coding apparatus, i.e., in a window that restricts an upper limit for the amount of parallel displacement in each of the horizontal and vertical directions.

③-1-5 Determination of Final Mode and Motion Vector (in Steps ST8 and ST9)

When completing the calculation of the cost and the updating of the minimum cost in above-mentioned ③-1-4 (in steps ST5, ST6, and ST7), the image coding apparatus then determines whether it has calculated the cost for each of all the prediction modes (in step ST8). When determining that the cost has not been calculated for each of all the prediction modes yet (i.e., if "IN" in step ST8), the image coding apparatus carries out all the processes in up to ③-1-4 that are previously explained (in steps ST1 to ST7). In contrast, when determining that the cost has been already calculated for each of all the prediction modes (i.e., if "Y" in step ST8), the image coding apparatus selects a prediction mode that provides the smallest one of a plurality of costs respectively acquired, in ③-1-4, for all the prediction modes on a macroblock-by-macroblock basis, as a prediction mode that is actually used (in step ST9). At the same time when determining the prediction mode, the image coding apparatus further determines a motion vector corresponding to the prediction mode (in step ST9).

Finally, the image coding apparatus compares the prediction mode determined in the motion compensated prediction process as previously explained with the intra mode so as to determine an optimum mode, and then multiplexes the coded mode information 13 indicating the optimum mode into the compressed image data 26 on a macroblock-by-macroblock basis by means of the variable length coding unit 6. The image coding apparatus further generates MVD data from the determined motion vector data 5 according to the procedure of ③-1-3, and then multiplexes the MVD data into the compressed image data 26 on a macroblock-by-macroblock basis by means of the variable length coding unit 6.

③-2 Motion Compensating Process by the Image Decoding Apparatus

Figure 9:
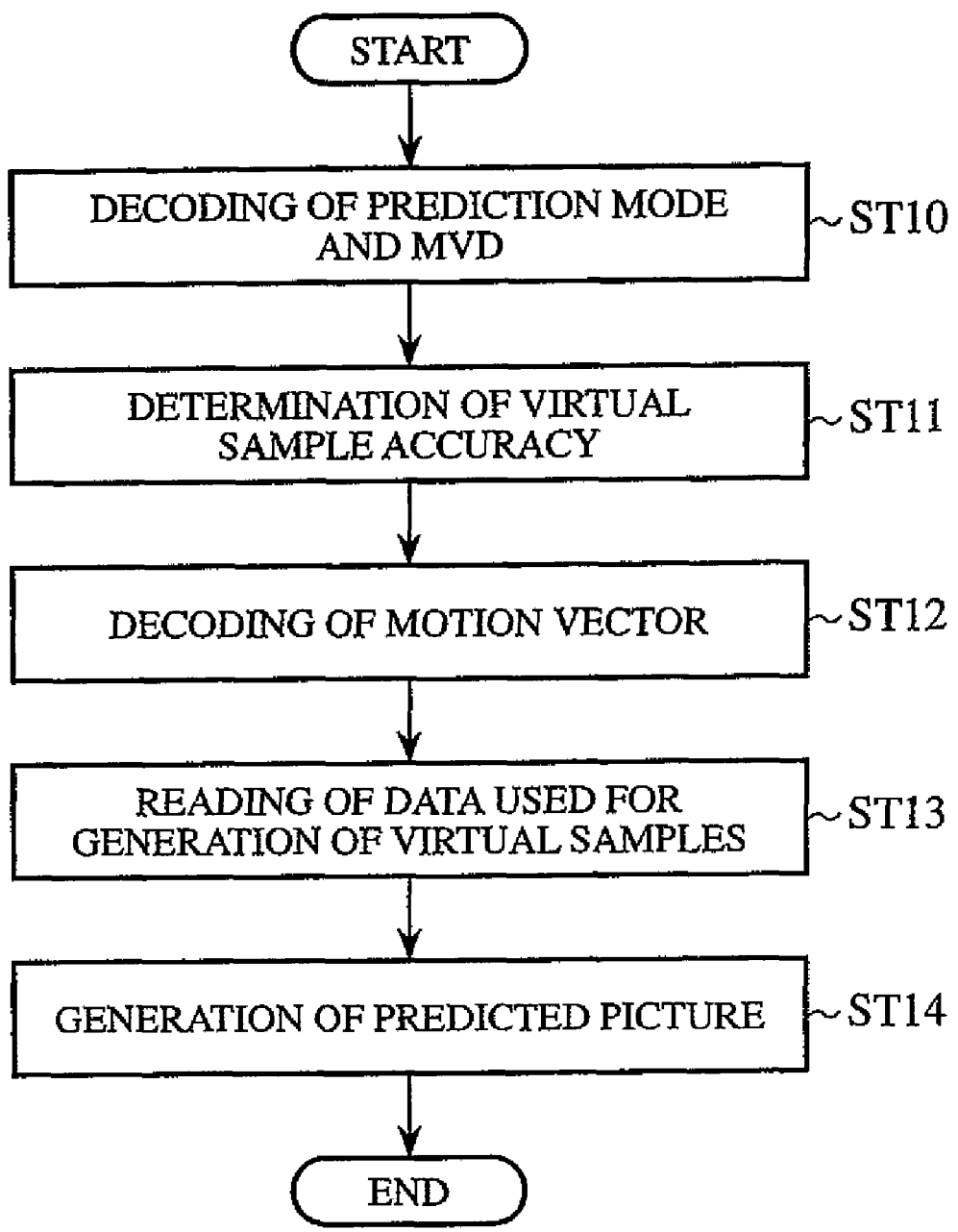
FIG. 9 is a flow chart showing motion compensation processing made by the image decoding apparatus in accordance with embodiment 1.

FIG. 9 shows a flow chart of the motion compensation process performed on the side of the image decoding apparatus. Hereafter, the motion compensation process performed on the side of the image decoding apparatus will be explained in detail with reference to the flow chart.

③-2-1 Decoding of Prediction Mode Data and Motion Vector Data (in step ST10)

In the image decoding apparatus as shown in FIG. 4, the variable-length decoding unit 27 decodes compressed image data 26, which is delivered thereto from the image coding apparatus, as shown in FIG. 3, for example, into coding mode information 13 on a macroblock-by-macroblock basis. When this coding mode information 13 indicates an inter (i.e., interframe prediction) mode, the variable-length decoding unit 27 decodes the motion vector data 5 coded in the form of a prediction difference value (MVD) (in step ST10).

③-2-2 Determination of Virtual Sample Accuracy (in Step ST11)

When the coding mode information 13 shows the inter (i.e., interframe prediction) mode, e.g., in the case of this embodiment 1, either of motion compensated prediction modes as shown in FIG. 6, the image decoding apparatus determines the virtual sample accuracy according to a procedure that is the same as the above-mentioned motion compensated prediction processing procedure ③-1-1 of the image coding apparatus (in step ST1). In other words, as previously mentioned when the operation of the image coding apparatus is explained, because the variable length coding unit 6 of the image coding apparatus encodes the shape information indicating the shape, size, and so on of each unit for motion compensated prediction, i.e., each motion vector detection unit, as a part of data about the motion prediction mode included in the coding mode information 13, the image decoding apparatus can determine both the shape and size of each motion vector detection unit that is a unit for motion compensated prediction, and the accuracy of virtual samples uniquely determined from the shape and size of each motion vector detection unit according to the shape information included in the decoded coding mode information 13 as a part of the data about the motion prediction mode.

③-2-3 Decoding of Motion Vector (in step ST12)

The image decoding apparatus then decodes the motion vector decoded in the form of a prediction difference value (MVD) into motion vector data (MV) that are actually used for each motion vector application unit region, i.e., each motion vector detection unit region as previously mentioned when the operation of the image coding apparatus is explained (in step ST12). This procedure is performed by the variable-length decoding unit 27 and so on of the image decoding apparatus in accordance with this embodiment 1, and is the inverse of the above-mentioned motion compensated prediction process procedure ③-1-3 of the image coding apparatus. In other words, in the case of this embodiment 1, as in the case of the determination of the accuracy of virtual samples, the image decoding apparatus can uniquely determine a method of predictively reconstructing a motion vector based on the shape information included in the coding mode information 13 as a part of the data about the motion prediction mode. Therefore the image decoding apparatus change the motion vector predictively-reconstructing method based on the shape information and then reconstructs a motion vector. This process will be explained with reference to FIG. 8 while comparing it with the procedure of ③-1-3.

As in the case of ③-1-3, the image decoding apparatus uses a common predictor setting method that is predetermined according to an agreement between the image coding apparatus and the image decoding apparatus. First of all, the image decoding apparatus uses PMV1 to reconstruct MV1 and MV3 as follows:

$$MV1 = MVD1 + (PMV1 >> 1)$$

$$MV3 = MVD3 + (PMV1 >> 1)$$

where MVD1 is a prediction difference value (MVD) corresponding to MV1, and MVD3 is a prediction difference value (MVD) corresponding to MV3.

The image decoding apparatus further reconstructs MV2 and MV4 as follows:

$$MV2 = MVD2 + MV1$$

$$MV4 = MVD4 + MV3$$

The image decoding apparatus also reconstructs MV5 as follows:

$$MV5 = MVD5 + (PMV2 << 1)$$

In other words, the image decoding apparatus reconstructs each motion vector according to the following conditional expressions:

(1) Condition 1: when the motion vector in question (MV) is the one acquired by a prediction using virtual samples of ½-pixel accuracy, the condition 1 is divided into the following two conditions according to the accuracy of PMV.

Condition 1-1: when PMV is a motion vector that uses virtual samples of the same accuracy, i.e., ½-pixel accuracy, $$MVD = MV + PMV$$

Condition 1-2: when PMV is a motion vector that uses virtual samples of ¼-pixel accuracy, $$MV = MVD + (PMV >> 1)$$

(2) Condition 2: when the motion vector in question (MV) is the one acquired by a prediction using virtual samples of ¼-pixel accuracy, the condition 2 is divided into the following two conditions according to the accuracy of PMV.

Condition 2-1: when PMV is a motion vector that uses virtual samples of the same accuracy, i.e., ¼-pixel accuracy, $$MV = MVD + PMV$$

Condition 2-2: when PMV is a motion vector that uses virtual samples of ½-pixel accuracy, $$MV = MVD + (PMV << 1)$$

The image decoding apparatus thus reconstructs each motion vector according to this rule.

③-2-4 Generation of Predicted Picture (in Steps ST13 and S14)

The image decoding apparatus generates a predicted picture for each individual motion vector application unit region by using the motion vector data deconstructed in ③-2-3 according to the virtual sample generation rule determined in ③-2-2. The image decoding apparatus can further generate both virtual samples having half-pixel accuracy, as shown in FIG. 1, and virtual samples having ¼ pixel accuracy, as shown in FIG. 2. Assume that the image decoding apparatus does not perform block boundary mirroring when generating virtual samples in the vicinity of the boundaries of each subblock as shown in FIG. 2, and the number of filter taps is K for generalizing the following explanation of the motion compensated prediction processing carried out by the image decoding apparatus. Therefore, in a mode, such as 8×4, 4×8, or 4×4 MC mode, in which the macroblock in question is divided into a plurality of subblocks smaller than 8×8 MC and which uses virtual samples of half-pixel accuracy, the image decoding apparatus reads pixel data required for generating virtual samples from the frame memory, as shown in the lower row of FIG. 7, so as to generate a predicted picture, as in the case that the image coding apparatus performs motion compensated prediction processing in step ST2.

The use of either of the image coding apparatus and the image decoding apparatus in accordance with this embodiment 1 having the above-mentioned structure makes it possible to adapt to local movements and then change both the accuracy of virtual samples and a method of calculating motion vectors according to the size of a block that is a unit for motion compensated prediction when carrying out a motion compensated prediction. Therefore, compressing and coding can be carried out with the image quality being maintained at a high level while the memory bandwidth is reduced. Particularly, when a player for mainly playing back video images, the player including the image decoding apparatus, is incorporated into a piece of hardware such as a mobile phone or mobile terminal equipment, a reduction in the memory bandwidth offers a remarkable advantage of simplifying the implementation of image decoding and reducing the electric power consumption of the hardware.

As previously mentioned in this embodiment 1, the image coding apparatus and the image decoding apparatus in accordance with this embodiment 1 can change the accuracy of virtual samples when carrying out a motion compensated prediction according to the size of each block that is a unit for motion compensated prediction, and can also change the method of calculating motion vectors. In accordance with the present invention, the image coding apparatus and the image decoding apparatus in accordance with this embodiment 1 can alternatively change only the accuracy of virtual samples when carrying out a motion compensated prediction according to the size of each block that is a unit for motion compensated prediction without changing the method of calculating motion vectors. However, in this variant, although the coding efficiency can be improved while the memory bandwidth is reduced, the image quality is reduced as the accuracy of motion compensated predictions is reduced. All the following embodiments can include this variant.

Furthermore, the image coding apparatus according to this embodiment 1 is so constructed as to change the nature of the filtering process for generation of virtual samples according to the accuracy of virtual samples which the image coding apparatus uses after determining the accuracy of virtual samples in ③-1-1. Similarly, the image decoding apparatus according to this embodiment 1 is so constructed as to change the nature of the filtering process for generation of virtual samples according to the accuracy of virtual samples which the image decoding apparatus uses after determining the accuracy of virtual samples in ③-2-2. In the case of ¼-pixel accuracy, each of the image coding apparatus and the image decoding apparatus generates virtual samples having half-pixel accuracy by means of K (=8) tap filters by using integer pixel data first, as shown in FIG. 2, and further generates samples having ¼-pixel accuracy by linearly interpolating those generated virtual samples having half-pixel accuracy. In the case of half-pixel accuracy, each of the image coding apparatus and the image decoding apparatus generates samples having half-pixel accuracy by linearly interpolating integer pixel data. In this case, each of the image coding apparatus and the image decoding apparatus only has to read pixel data about pixels whose number is (the number of pixels included in a subblock that is the target for motion compensated prediction+the number of pixels that are placed outside of the subblock and are apart form the boundaries of the subblock by one pixel) from the frame memory. Thus, by changing the nature of the filtering process for generation of virtual samples according to the accuracy of virtual samples, each of the image coding apparatus and the image decoding apparatus can reduce the amount of data read from the frame memory for motion compensated predictions on small subblocks. As an alternative, each of the image coding apparatus and the image decoding apparatus can uniquely determine the nature of the filtering process independently upon the accuracy of virtual samples. In other words, each of the image coding apparatus and the image decoding apparatus can be so constructed as to generate samples having half-pixel accuracy by using K tap filters even in the case of small subblocks that use only samples having half-pixel accuracy. This fixing of the nature of the filtering process doesn't reduce the memory bandwidth for the amount of data read from the frame memory. However, it is not necessary to perform a process of creating samples having ¼-pixel accuracy from samples having half-pixel accuracy which are generated by K tap filters and it is possible to still limit the representation accuracy of motion vectors as previously mentioned in ③-1-3 and ③-2-3, thereby improving the efficiency of coding motion vectors.

In accordance with this embodiment 1, a video image is always input on a frame-by-frame basis. When an interlaced video image composed of frames, each of which is decomposed into an even field and an odd field, is input, each frame is strictly defined by a combination of picture data about two fields. In this case, each of the image coding apparatus and the image decoding apparatus in accordance with embodiment 1 can be so constructed as to divide each of the two fields included in each frame of an input video image or input coded video image into a plurality of macroblocks and to code or decode each of the plurality of macroblocks according to the above-mentioned procedure. Each of all the following embodiments can include this variant.

As previously mentioned, each of the image coding apparatus and the image decoding apparatus in accordance with this embodiment 1 uses virtual samples having half-pixel accuracy for motion vector detection unit regions, such as regions of 8×4 size, regions of 4×8 size, and regions of 4×4 size which are smaller than regions of 8×8 size. The present invention is not limited to this case. For example, each of the image coding apparatus and the image decoding apparatus in accordance with this embodiment 1 can alternatively use virtual samples having half-pixel accuracy for motion vector detection unit regions, such as regions of 4×2 size and regions of 2×4 size other than 8×4 size, regions of 4×8 size, and regions of 4×4 size. As an alternative, each of the image coding apparatus and the image decoding apparatus can define subblocks of other sizes other than 8×8 size, such as blocks of 8×16 size or blocks of 16×8 size as reference subblocks, and can determine whether or not each subblock is larger than these reference subblocks so as to change the accuracy of virtual samples. Furthermore, instead of using virtual samples having half-pixel accuracy for motion vector detection unit regions having a smaller size than the predetermined size such as 8×8 size, each of the image coding apparatus and the image decoding apparatus can carry out motion compensated predictions with integer pixel accuracy for motion vector detection unit regions having a smaller size than the predetermined size. As a result, although the image quality is reduced to a certain degree, the memory bandwidth can be greatly reduced. In short, each of the image coding apparatus and the image decoding apparatus only has to lower the accuracy of searching for motion vectors for motion vector detection unit regions, into which the image coding apparatus divides each macroblock that is a unit to be coded or decoded and on which the image coding apparatus performs motion compensated predictions, with reference to the predetermined blocksize that exerts an influence upon the memory bandwidth, so as to reduce the memory bandwidth. Each of all the following embodiments can include this variant.

Embodiment 2

Each of an image coding apparatus and an image decoding apparatus in accordance with this embodiment 2 can include a frame memory group that consists of a plurality of frame memories and a unit of performing motion compensated predictions by using the plurality of frame memories for each macroblock or each of a plurality of motion compensated prediction blocks into which each macroblock is divided, in addition to the structure of the image coding apparatus or the image decoding apparatus in accordance with above-mentioned embodiment 1.

Figure 10:
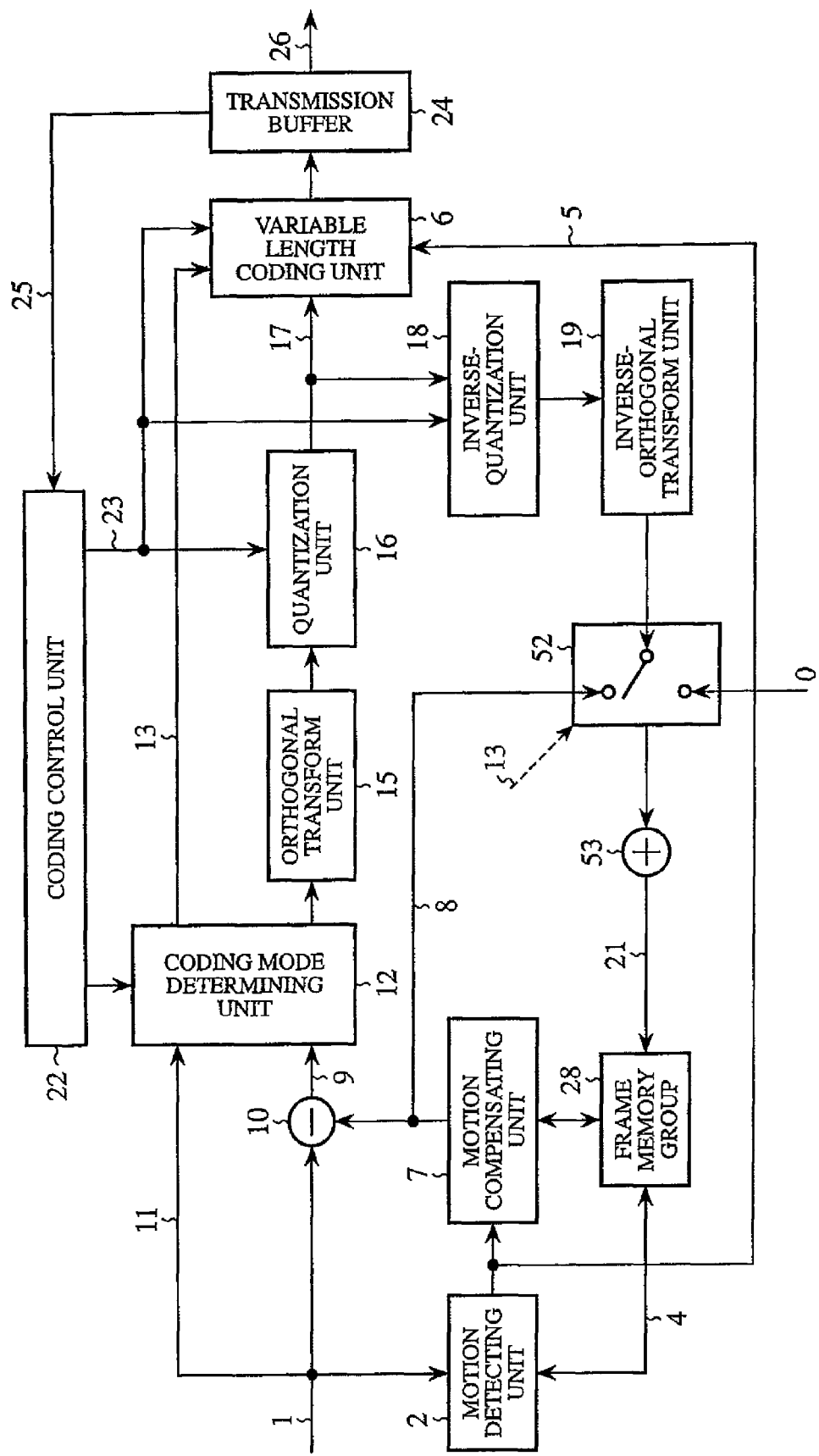
FIG. 10 is a diagram showing the structure of an image coding apparatus in accordance with embodiment 2.

FIG. 10 shows the structure of the image coding apparatus in accordance with this embodiment 2. As shown in the figure, the image coding apparatus in accordance with this embodiment 2 differs from that of above-mentioned embodiment 1 as shown in FIG. 3 in that the frame memory 3 is replaced by the frame memory group 28, and a motion detecting unit 2 and a motion compensating unit 7 are so constructed as to use the frame memory group 28 to acquire optimum predicted pictures and motion vectors from the plurality of frame memories. In the following, the operations of the motion detecting unit 2 and the motion compensating unit 7 will be explained on the understanding that they operate differently from those of the image coding apparatus of FIG. 3, which are designated by the same reference numerals.

① General Description of the Operation of the Image Coding Apparatus

Assume that each of frames included in a video image is divided into a plurality of macroblocks and an input video signal 1 is input to the image coding apparatus of this embodiment 2 on a macroblock-by-macroblock basis. First of all, the motion detecting unit 2 detects a motion vector 5 for each of the plurality of macroblocks by using a plurality of reference pictures 4 stored in the frame memory group 28.

There is a bidirectional prediction method disclosed by, for example, ISO/IEC13818-2 (MPEG-2 video standard) as a method of detecting a motion vector by using a plurality of reference pictures.

Figure 11:
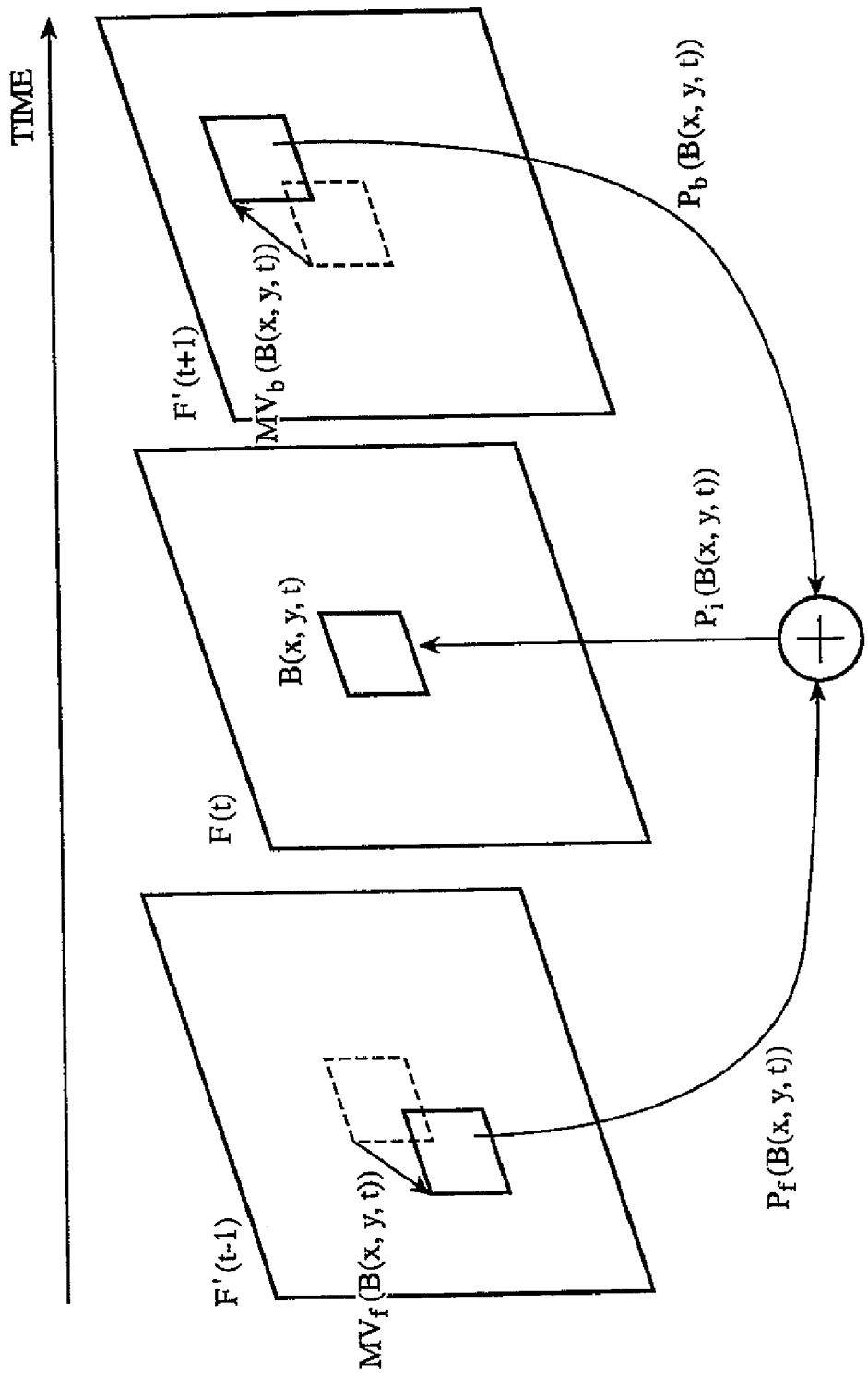
FIG. 11 is a diagram showing a method of performing a bidirectional prediction.

FIG. 11 shows the bidirectional prediction method disclosed by ISO/IEC13818-2 (MPEG-2 video standard). In the figure, F(t) is an input image frame that is a target to be coded now, and a reference picture stored in a frame memory is designated by F'( ) and is distinguished from F(t). Furthermore, B(x, y, t) is a block that is a motion compensated prediction unit within F(t). When using bidirectional prediction, a picture of a block that is located in a past reference picture F'(t−1) and that is made to move, by only a motion vector $MV_f(B(x, y, t))$, from the position of B(x, y, t) is defined as a forward predicted picture $P_f(B(x, y, t))$, and a picture of a block that is located in a future reference picture F'(t+1) and that is made to move, by only a motion vector $MV_b(B(x, y, t))$, from the position of B(x, y, t) is defined as a backward predicted picture $P_b(B(x, y, t))$. The motion detecting unit 2 generates a predicted picture $P_i(B(x, y, t))$ of B(x, y, t) by calculating a mean value of $P_f(B(x, y, t))$ and $P_b(B(x, y, t))$. The motion detecting unit 2 searches for either a block having a picture that has a high degree of similarity to the picture of B(x, y, t) or a block having the smallest difference in pixel values between B(x, y, t) and the block itself within a given searching range of each reference picture F'(t−1) or F'(t+1), and defines a vector indicating a translational motion from B(x, y, t) to the searched-for block as $MV_f(B(x, y, t))$ or $Mv_b(B(x, y, t))$.

Figure 12:
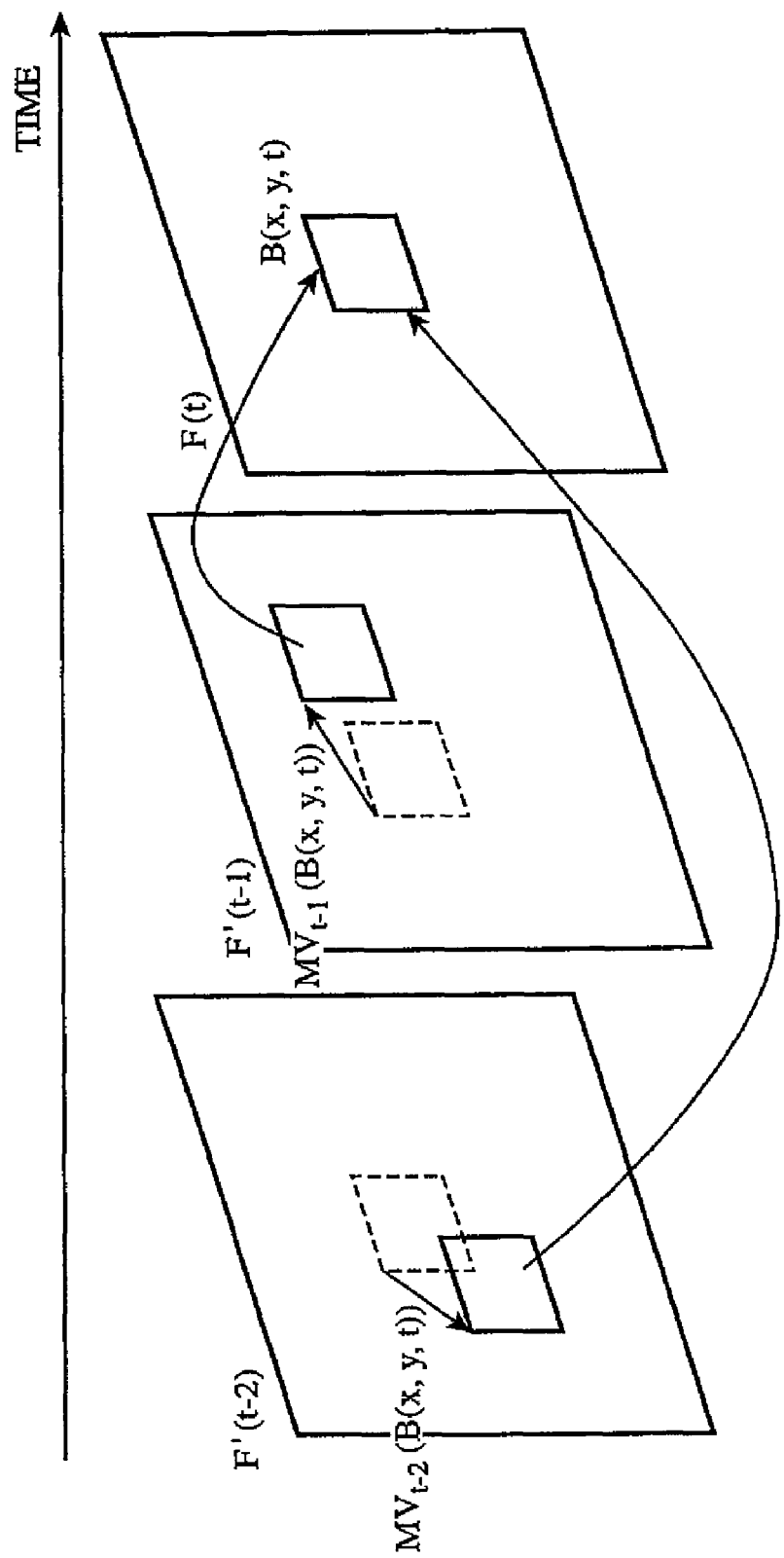
FIG. 12 is a diagram showing an example of prediction other than bidirectional prediction, for detecting a motion vector by using a plurality of reference pictures.

FIG. 12 shows an example of a unidirectional prediction process of detecting a motion vector by using a plurality of reference pictures. The example as shown in FIG. 12 is performed by an encoder that is so constructed as to store a plurality of reference pictures in a frame memory group 28, as disclosed in Japanese patent application publication (TOKKAIHEI) No. 4-127689, for example. Even when there is no block that has a high degree of similarity to the picture of B(x, y, t) that is a motion compensated prediction unit in an immediately preceding reference picture F'(t−1), and finding out a block that has a high degree of similarity to the picture of B(x, y, t) that is a motion compensated prediction unit in a further preceding reference picture F'(t−2), because the image coding apparatus can perform a motion compensated prediction by using a motion vector $MV_{t-2}(B(x, y, t))$, the image coding apparatus can perform motion compensated predictions according to local properties of the input video image.

Because the image coding apparatus according to this embodiment 2 includes the frame memory group 28 that consists of the plurality of frame memories, the image coding apparatus can be applied to either of the cases, as shown in FIGS. 11 and 12, of detecting a motion vector by using a plurality of reference pictures stored in the plurality of frame memories.

In accordance with this embodiment 2, a motion vector 5 that is detected as shown in the exemplary case of FIG. 11 or 12 includes information indicating which frame memories in the frame memory group 28 are referred by the motion detecting unit when detecting the motion vector 5.

Therefore, the motion compensating unit 7 of this embodiment 2 acquires a predicted picture 8 by referring to an appropriate frame memory of the frame memory group 28 according to that information. The motion compensating unit 7 further calculates a predictive residual signal 9 by obtaining a difference between the input signal 1 and the predicted picture. The motion vector 5 does not necessarily include the information indicating which frame memories in the frame memory group 28 are referred by the motion detecting unit. As an alternative, the information can be expressed in the form of coded data that are notified, as other information, to the image decoding apparatus.

Furthermore, a coding mode determining unit 12 of this embodiment 2 selects a mode in which the image coding apparatus can encode a macroblock in question with the highest degree of efficiency from among a plurality of modes each of which specifies a method of coding the macroblock, such as a motion prediction mode in which the image coding apparatus encodes the predictive residual signal 9, and an intra mode in which the image coding apparatus intra-codes the macroblock, and outputs coding mode information 13 indicating the selected mode. When the motion prediction mode is selected, the coding mode information 13 also indicates the shapes of subblocks into which the macroblock is further divided, as shown in FIG. 6 and explained in embodiment 1, whether a prediction is performed by using only $P_f(B(x, y, t))$ and/or $P_b(B(x, y, t))$ as shown in FIG. 11, and whether or not a mean value of them is calculated. The coding mode information 13 is then delivered to a variable length coding unit 6 as a piece of target information to be coded. When the motion prediction mode is selected and the coding mode information 13 indicating the motion prediction mode is delivered to the variable length coding unit 6, the motion vector 5 is also delivered to the variable length coding unit 6 as a piece of target information to be coded. The variable length coding unit 6 then variable length encodes the motion vector 5.

Because an orthogonal transform unit and components placed immediately behind the orthogonal transform unit encodes a target signal to be coded 11 in the mode selected by the coding mode determining unit 12, like those of the image coding apparatus in accordance with embodiment 1, the detailed explanation of the coding process will be omitted hereafter.

Next, the image decoding apparatus in accordance with this embodiment 2 will be explained.

Figure 13:
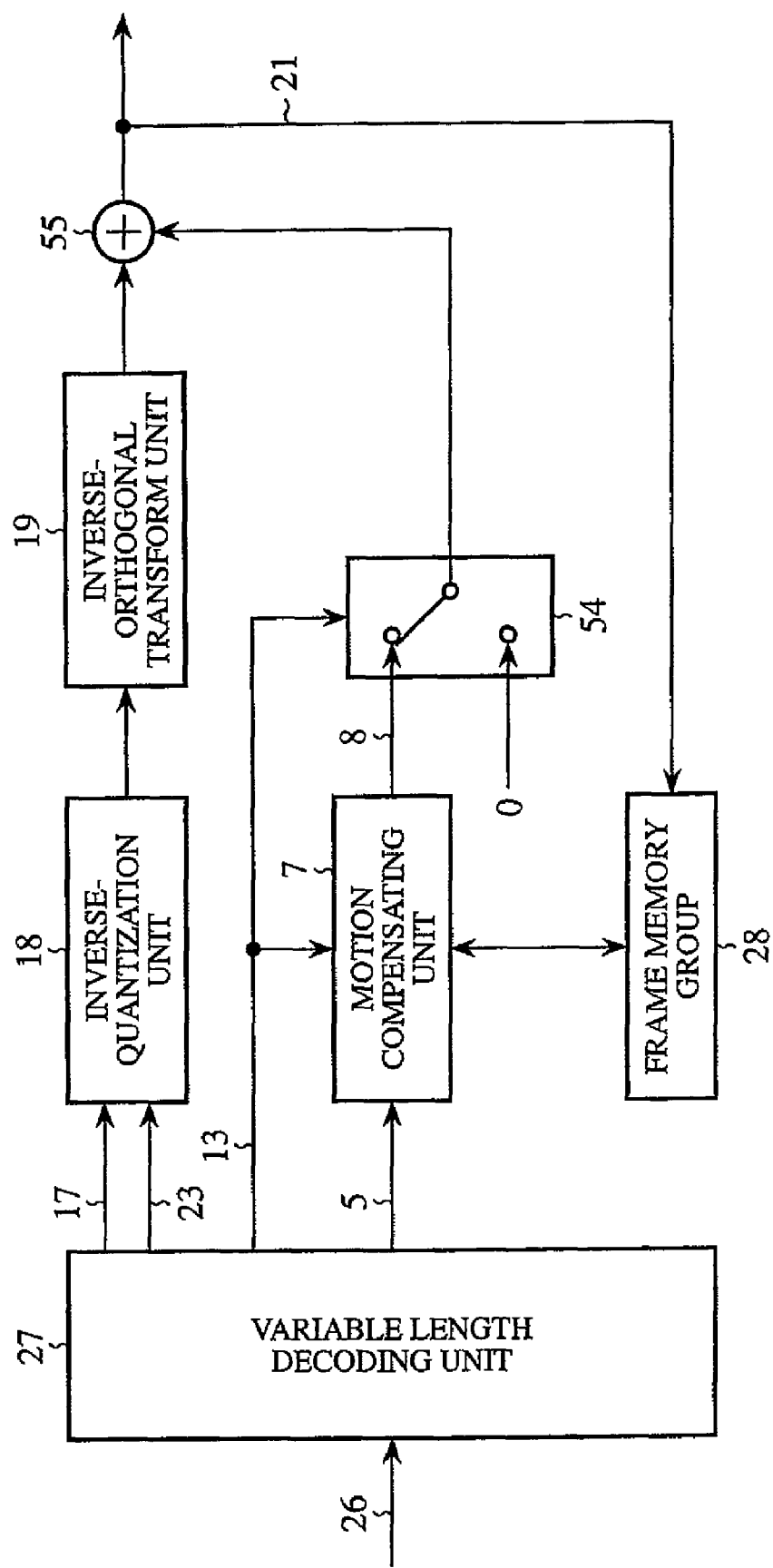
FIG. 13 is a diagram showing the structure of an image decoding apparatus in accordance with embodiment 2.

FIG. 13 shows the structure of the image decoding apparatus in accordance with this embodiment 2. As shown in the figure, the image decoding apparatus in accordance with this embodiment 2 differs from that of above-mentioned embodiment 1 as shown in FIG. 4 in that the frame memory 3 is replaced by a frame memory group 28, and a motion compensating unit 7 is so constructed as to acquire a predicted picture from a specified frame memory in the frame memory groups 28 according to both a motion vector 5 and coding mode information 13 reconstructed by a variable-length decoding unit 27. In the following, the operation of the motion compensating unit 7 will be explained on the understanding that it operates differently from that of the image decoding apparatus of FIG. 4, which is designated by the same reference numeral.

② General Description of the Operation of the Image Decoding Apparatus

When receiving compressed image data 26, the image decoding apparatus performs entropy decoding by means of the variable-length decoding unit 27, as described later, so as to reconstruct a motion vector 5, coding mode information 13, orthogonal transform coefficient data 17, a quantization step parameter 23, and so on. Because the image decoding apparatus performs a process of reconstructing a predictive residual signal by using the orthogonal transform coefficient data 17 and the quantization step parameter 23, like that of embodiment 1, the detailed explanation of the reconstructing process will be omitted hereafter.

Then, the motion compensating unit 7 reconstructs a predicted picture 8 based on both the motion vector 5 and the coding mode information 13 reconstructed by the variable-length decoding unit 27 by using reference pictures stored in predetermined frame memories of the frame memory group 28, like that of the image decoding apparatus in accordance with embodiment 1.

A switching unit 54 delivers the predicted picture 8 from the motion compensating unit 7 to an adder 55 when the coding mode information 13 indicates the motion prediction mode. In contrast, when the coding mode information 13 indicates the intra mode, the switching unit 54 delivers 0 to the adder 55. The adder 55 then adds the output of the switching unit 54 to a reconstructed signal that is an output of a inverse-orthogonal transform unit 19 so as to acquire a reconstructed picture 21. The reconstructed picture 21 is then stored in the frame memory group 28 and is used for generation of predicted pictures of the following frames.

③ Description of Motion Compensated Predictions

It is clear from FIGS. 11 and 12 that it is possible to divide each of the motion compensated prediction process performed by the image coding apparatus by using the motion detecting unit 2, the motion compensating unit 7, and the frame memory group 28, and the motion compensation process performed by the image decoding apparatus by using the motion compensating unit 7 and the frame memory group 28 into a plurality of units to be processed, the plurality of units being associated with the plurality of frame memories included in the frame memory group 28, respectively. In other words, the process of acquiring the motion vector 5 and the predicted picture 8 by using frame memories in which individual reference pictures (e.g., F'(t−1) and so on) are stored, which is carried out on the side of the image coding apparatus, can be assumed to be equivalent to the motion compensated prediction processes ③-1 including ③-1-1 to ③-1-5, as explained in embodiment 1, which are carried out by the image coding apparatus of embodiment 1, and the process of acquiring the predicted picture 8 by using frame memories in which individual reference pictures (e.g., F'(t−1) and so on) are stored, which is carried out on the side of the image decoding apparatus, can be assumed to be equivalent to the motion compensated prediction processes ③-2 including ③-2-1 to ③-2-4, as explained in embodiment 1, which are carried out by the image decoding apparatus of embodiment 1. Each of the image coding apparatus and the image decoding apparatus in accordance with embodiment 2 can carry out the above-mentioned process according to the corresponding procedure as described in embodiment 1.

The use of either of the image coding apparatus and the image decoding apparatus in accordance with this embodiment 2 having the above-mentioned structure makes it possible to adapt to local movements and change both the accuracy of virtual samples and a method of calculating motion vectors according to the size of each block that is a unit for motion compensated prediction when carrying out a motion compensated prediction. Therefore, compressing and coding can be carried out with the image quality being maintained at a high level while the memory bandwidth is reduced.

Particularly, when it is necessary to generate a predicted picture from reference pictures stored in the plurality of frame memories in bidirectional prediction including both forward prediction and backward prediction, as shown in FIG. 11, or when it is necessary to generate a predicted picture from reference pictures stored in the plurality of frame memories even in unidirectional prediction, as shown in FIG. 12, it is clear that the number of pixels read from the frame memory group increases accordingly. However, according to this embodiment 2, when the effect of fine motion compensated prediction is weakened due to complicated movements or the like, the representation accuracy of the motion vectors can be reduced by limiting the accuracy of virtual samples up to half-pixel accuracy or integer-pixel accuracy and therefore the memory bandwidth at the time of frame memory access can be reduced while the coding efficiency is maintained. As a result, according to this embodiment 2, particularly, when the image coding apparatus carries out bidirectional prediction or the like by performing a motion compensated prediction with reference to a plurality of reference pictures stored in the plurality of frame memories, it is expected that a remarkable reduction in the amount of computations is made for the motion vector detection processing by the image coding apparatus and for the predicted picture generation processing by the image decoding apparatus.

Furthermore, in accordance with this embodiment 2, because each of the image coding apparatus and the image decoding apparatus includes the plurality of frame memories, instead of using normal bidirectional predictions, as shown in FIG. 11, or unidirectional predictions from a plurality of past reference pictures, as shown in FIG. 12, each of the image coding apparatus and the image decoding apparatus can successively update the contents of the plurality of frame memories with decoded pictures under normal conditions, for example, and, when an instruction or the like for not updating the contents of only one of the plurality of frame memories is provided, uses the plurality of frame memories, as a short-term frame memory that can be updated successively and a long-term frame memory whose reference picture is not updated until the next event is generated, without updating the contents of the only one of the plurality of frame memories, so as to carry out motion compensated predictions by using reference pictures stored in the short-term frame memory and the long-term frame memory. In accordance with this variant, each of the image coding apparatus and the image decoding apparatus can flexibly use the plurality of frame memories according to timewise local properties of the moving picture signal, and can encode each macroblock while efficiently using the plurality of frame memories, thereby maintaining the prediction efficiency at a high level regardless of the coding sequence.

Particularly, in addition to adapting to local movements and then changing both the accuracy of virtual samples and the method of calculating motion vectors according to the size of a block that is a unit for motion compensated prediction when carrying out a motion compensated prediction, each of the image coding apparatus and the image decoding apparatus can adaptively switch between bidirectional prediction as shown in FIG. 12 and unidirectional prediction as shown in FIG. 11 or the like for each region in which a motion compensated prediction is made, or can adaptively switch between the successively updating of the contents of the plurality of frame memories with decoded pictures under normal conditions and the updating of the contents of the plurality of frame memories, except for only one frame memory, with decoded pictures when an instruction or the like for not updating the contents of the only one of the plurality of frame memories is provided for each region in which a motion compensated prediction is made. As a result, even when various features, such as not only spatial local movements but also local movements that vary with time, appear in the video image to be processed, the coding efficiency can be improved without increasing the memory bandwidth and the image quality can be increased.

Embodiment 3

In embodiment 3, an image coding apparatus and an image decoding apparatus respectively having a virtual sample calculation method switching flag with which the degree of freedom of adaptively switching between methods of calculating virtual samples in addition to the structures of the image coding apparatus and the image decoding apparatus in accordance with embodiment 1 or embodiment 2 will be explained.

Each of the image encoding apparatus and the image decoding apparatus as shown in embodiments 1 and 2 is so constructed as to perform motion compensated predictions only on virtual samples of half-pixel accuracy in a mode using blocks smaller than 8×8 MC, such as blocks of 8×4 size, blocks of 4×8 size, and blocks of 4×4 size, as shown in FIG. 6. According to a video image to be processed, there are cases in which each of the image coding apparatus and the image decoding apparatus needs to perform motion compensated predictions having ¼-pixel accuracy in order to improve the prediction efficiency even in a mode using blocks smaller than 8×8 MC. For example, there can be cases in which while a picture that is a target for motion compensated prediction sufficiently stores textures, a slight amount of noise superimposed on an input signal causes variations in motion vectors. In such a case, each of the image coding apparatus and the image decoding apparatus can be so constructed as to adapt to a local signal condition of the video image so as to select an optimum degree of accuracy of virtual samples without fixing the accuracy of virtual samples by simply taking only the complexity of movements into consideration. As a result, each of the image coding apparatus and the image decoding apparatus additionally carries out a minimum amount of computations only when fine accuracy of virtual samples is truly needed, thereby further improving the image coding quality.

Figure 14:
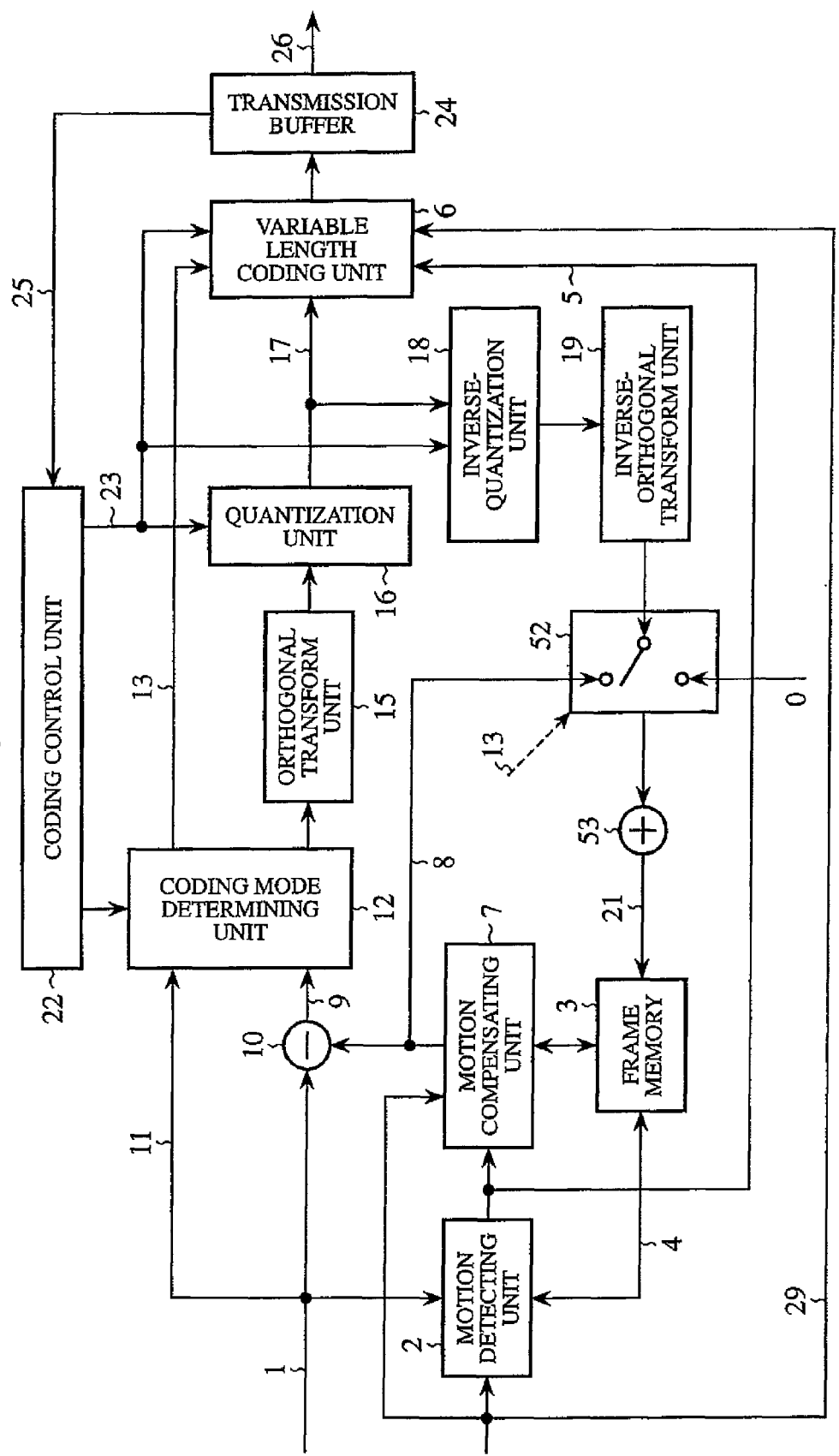
FIG. 14 is a diagram showing the structure of an image coding apparatus in accordance with embodiment 3.
Figure 15:
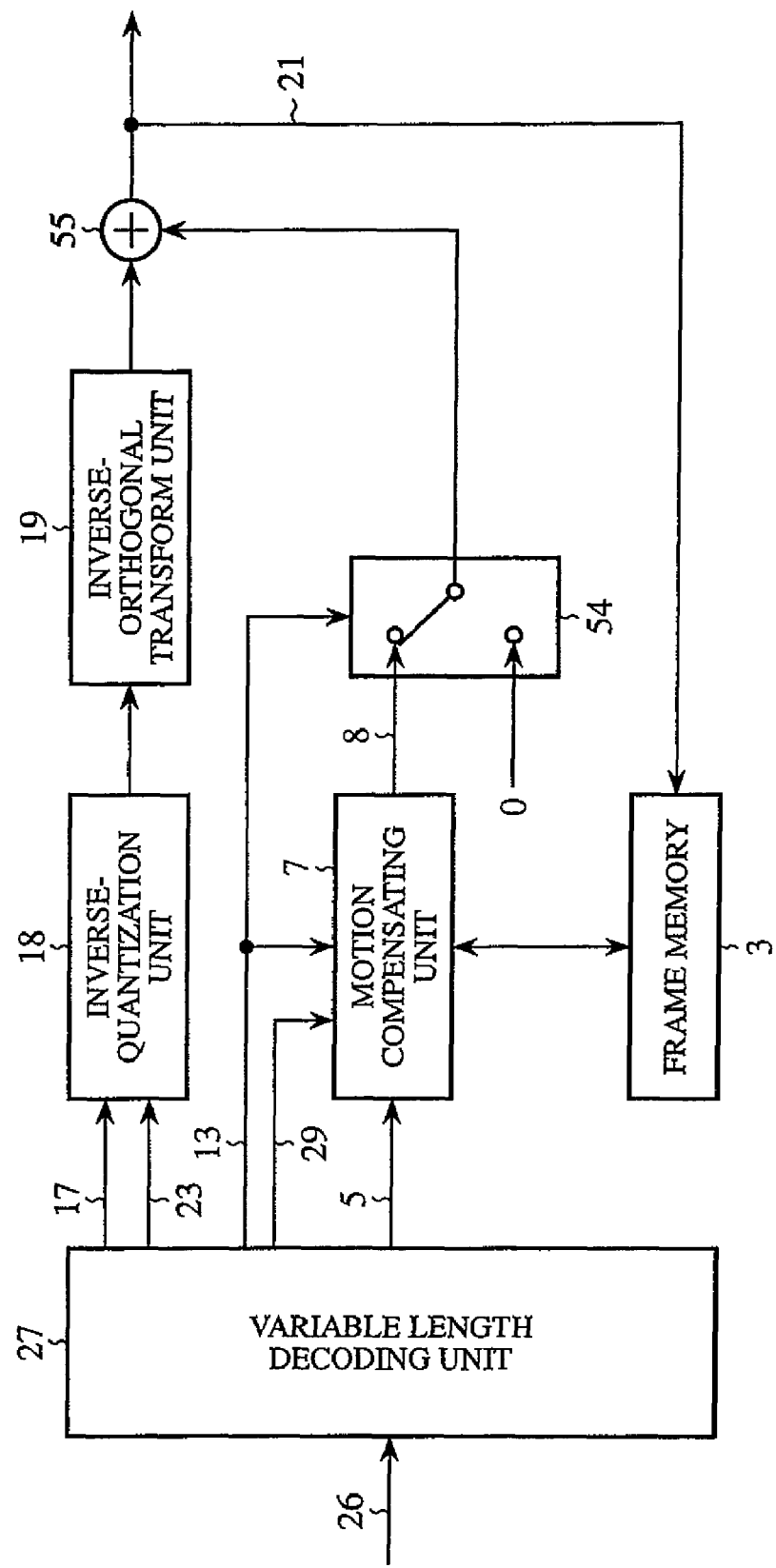
FIG. 15 is a diagram showing the structure of an image decoding apparatus in accordance with embodiment 3.

FIG. 14 shows the structure of the image coding apparatus in accordance with this embodiment 3, and FIG. 15 shows the structure of the image decoding apparatus in accordance with this embodiment 3. In FIGS. 14 and 15, a virtual sample accuracy switching flag 29 that is a signal indicating switching between two or more degrees of accuracy of motion compensated predictions plays a role in above-mentioned adaptation of the accuracy of motion compensated predictions. The other structure of each of the image coding apparatus and the image decoding apparatus in accordance with this embodiment 3 is the same as that of a corresponding one of those of embodiment 1 as shown in FIGS. 3 and 4.

Next, the operations of the image coding apparatus and the image decoding apparatus in accordance with this embodiment 3 will be explained.

The image coding apparatus of this embodiment 3 shown in FIG. 14 determines the value of the virtual sample accuracy switching flag 29 for each predetermined video image data based on either results obtained by preanalyzing the input video image data by the image coding apparatus or external factors associated with a system including the image coding apparatus, e.g., transmission conditions such as a remaining amount of a transmission buffer 24 and a coding bit rate, and delivers the virtual sample accuracy switching flag to both a motion detecting unit 2 and a motion compensating unit 7. When performing motion compensated predictions, the motion detecting unit 2 and the motion compensating unit 7 change both the accuracy of virtual samples and the method of calculating motion vectors based on the received virtual sample accuracy switching flag 29 while adaptively changing units in which they will change both the accuracy of virtual samples and the method of calculating motion vectors, as described below, so as to generate a motion vector and a predicted picture.

It can be assumed that the value of the virtual sample accuracy switching flag 29 has one of the following definitions, for example. Concretely, the virtual sample accuracy switching flag 29 that is in the on state or 1 means that the motion detecting unit 2 and the motion compensating unit 7 are instructed to perform motion compensated predictions on all subblocks having a smaller blocksize than 8×8 MC in each video image data unit, which is a unit in which the accuracy of virtual samples and the method of calculating motion vectors are maintained, with ¼-pixel accuracy of motion compensated predictions. In other words, in this case, on the assumption that the image coding apparatus uses multiple tap filters as shown in FIG. 2, the image coding apparatus agrees to read a lot of pixel data from one or more frame memories while giving a higher priority to the prediction efficiency. In this case, because all motion vectors have the same accuracy, the image coding apparatus performs neither motion vector predictions nor calculation of the amount of codes accompanied by conversion of the accuracy of motion vectors as described in ③-1-3.

In contrast, the virtual sample accuracy switching flag 29 that is in the off state or 0 means that the motion detecting unit 2 and the motion compensating unit 7 are instructed to perform motion compensated predictions on all subblocks having a smaller blocksize than 8×8 MC, in the case of FIG. 6, all subblocks such as blocks of 8×4 size, blocks of 4×8 size, and blocks of 4×4 size, in each video image data unit with half-pixel accuracy of motion compensated predictions. This setting of the virtual sample accuracy switching flag is made in a case where a sufficient degree of prediction efficiency can be provided even if virtual samples having half-pixel accuracy as shown in FIG. 1 are used. In this case, because subblocks having a smaller blocksize than 8×8 MC have different degrees of accuracy of motion vectors, the image coding apparatus performs both motion vector predictions and calculation of the amount of codes accompanied by conversion of the accuracy of motion vectors as described in ③-1-3 when necessary. The virtual sample accuracy switching flag 29 doesn't necessarily have a fixed relationship between ON/OFF and 1/0, and can alternatively have an opposite relationship (i.e., ON=0, OFF=1) as a matter of course.

Moving image data units in which the value of the virtual sample accuracy switching flag 29 can be changed can be macroblocks, slices (unit regions of an image frame, each of the unit regions consisting of a plurality of macroblocks), frames, fields (in the case of an interlaced signal), sequences (i.e., time-series units each of which consists of a plurality of image frames), or the like.

The virtual sample accuracy switching flag 29 thus set by the image coding apparatus is multiplexed into a bitstream in units of predetermined video image data by the variable length coding unit 6.

In the image decoding apparatus, the variable-length decoding unit 27 decodes the coded value of the virtual sample accuracy switching flag 29, as shown in FIG. 15, in units of video image data to which the virtual sample accuracy switching flag 29 is added, and carries out a process, as described in ③-2-3, for decoding the motion vector 5 having adaptively-determined accuracy according to the above-mentioned rule when necessary, and the motion compensating unit 7 generates a predicted picture 8 based on both generated virtual samples having a degree of accuracy of virtual samples which is specified by the virtual sample accuracy switching flag 29 and the reconstructed motion vector 5.

Therefore, according to this embodiment 3, each of the image coding apparatus and the image decoding apparatus having the above-mentioned structure can freely control a trade-off between the prediction efficiency and the load of computations and carry out the image coding or decoding processing with a high degree of freedom.

In this embodiment 3, the explanation of the incorporation of the virtual sample accuracy switching flag 2 into each of the image coding apparatus and the image decoding apparatus is made based on the case of embodiment 1. It is needless to say that the virtual sample accuracy switching flag 2 can be incorporated into each of the image coding apparatus and the image decoding apparatus in accordance with embodiment 2.

Embodiment 4

As previously mentioned, each of the image coding apparatus and the image decoding apparatus according to any one of embodiments 1 to 3 carries out normal intraframe coding or decoding processing containing no spatial prediction in the intra mode. In contrast, each of an image coding apparatus and an image decoding apparatus in accordance with this embodiment 4 has a spatial prediction unit 10a for coding or decoding a differential signal indicating a difference between a moving picture signal and a prediction signal by using an intraframe spatial prediction in an intraframe or intra prediction mode.

Figure 16:
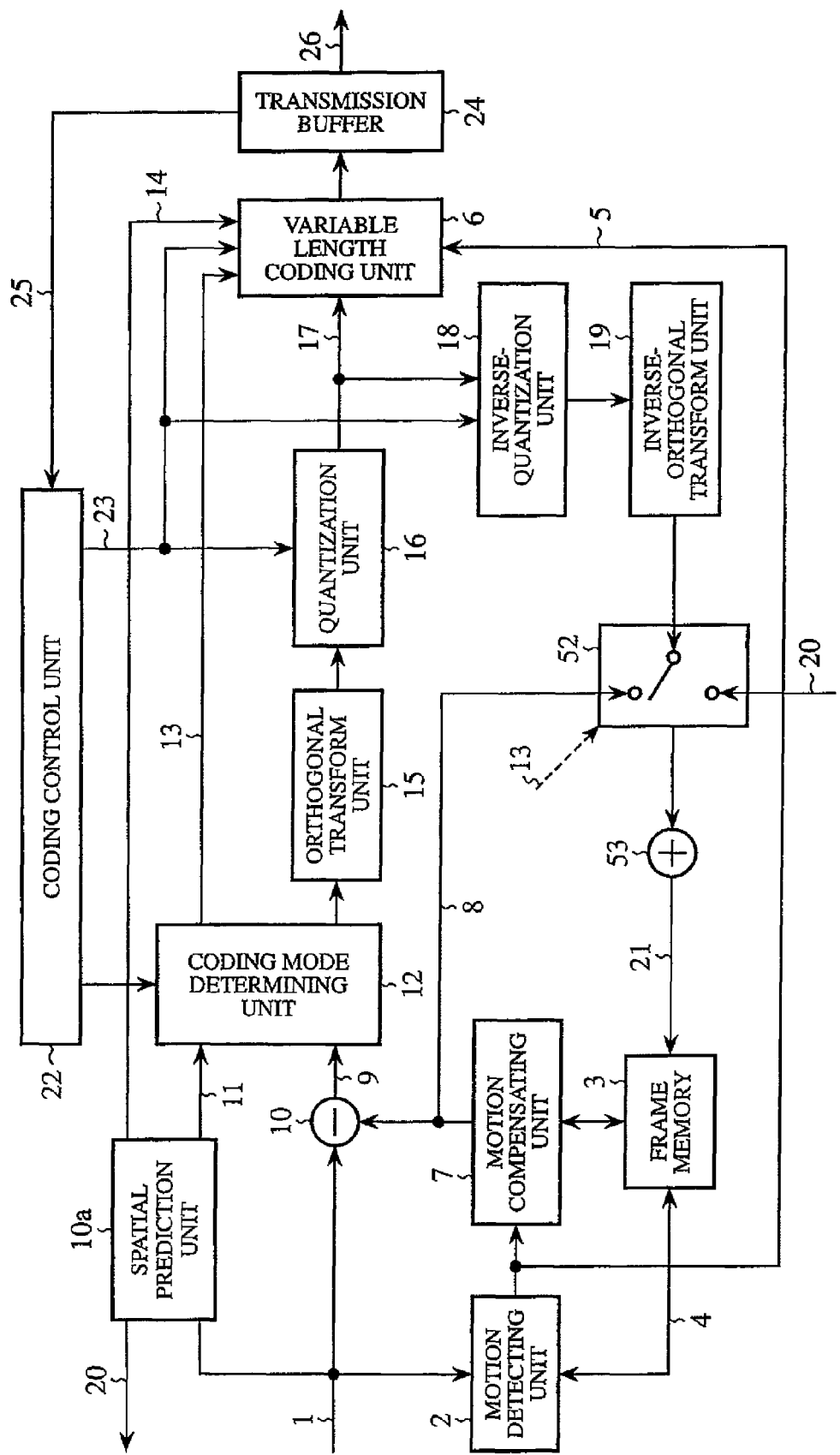
FIG. 16 is a diagram showing the structure of an image coding apparatus in accordance with embodiment 4.

FIG. 16 shows the structure of the image coding apparatus according to this embodiment 4 in which the spatial prediction unit 10a is added to the image coding apparatus according to embodiment 1 as shown in FIG. 3. As shown in FIG. 16, because the image coding apparatus of this embodiment 4 additionally includes the spatial prediction unit 10a, the image coding apparatus delivers intra prediction mode information 14 from the spatial prediction unit 10a to a variable length coding unit 6 and also delivers a spatially-predicted picture 20, instead of 0, from the spatial prediction unit 10a to a switching unit 52 in the intra mode, unlike the image coding apparatus according to any one of embodiments 1 to 3. Except for this operation, the image coding apparatus operates in the same manner as that according to embodiment 1.

Figure 17:
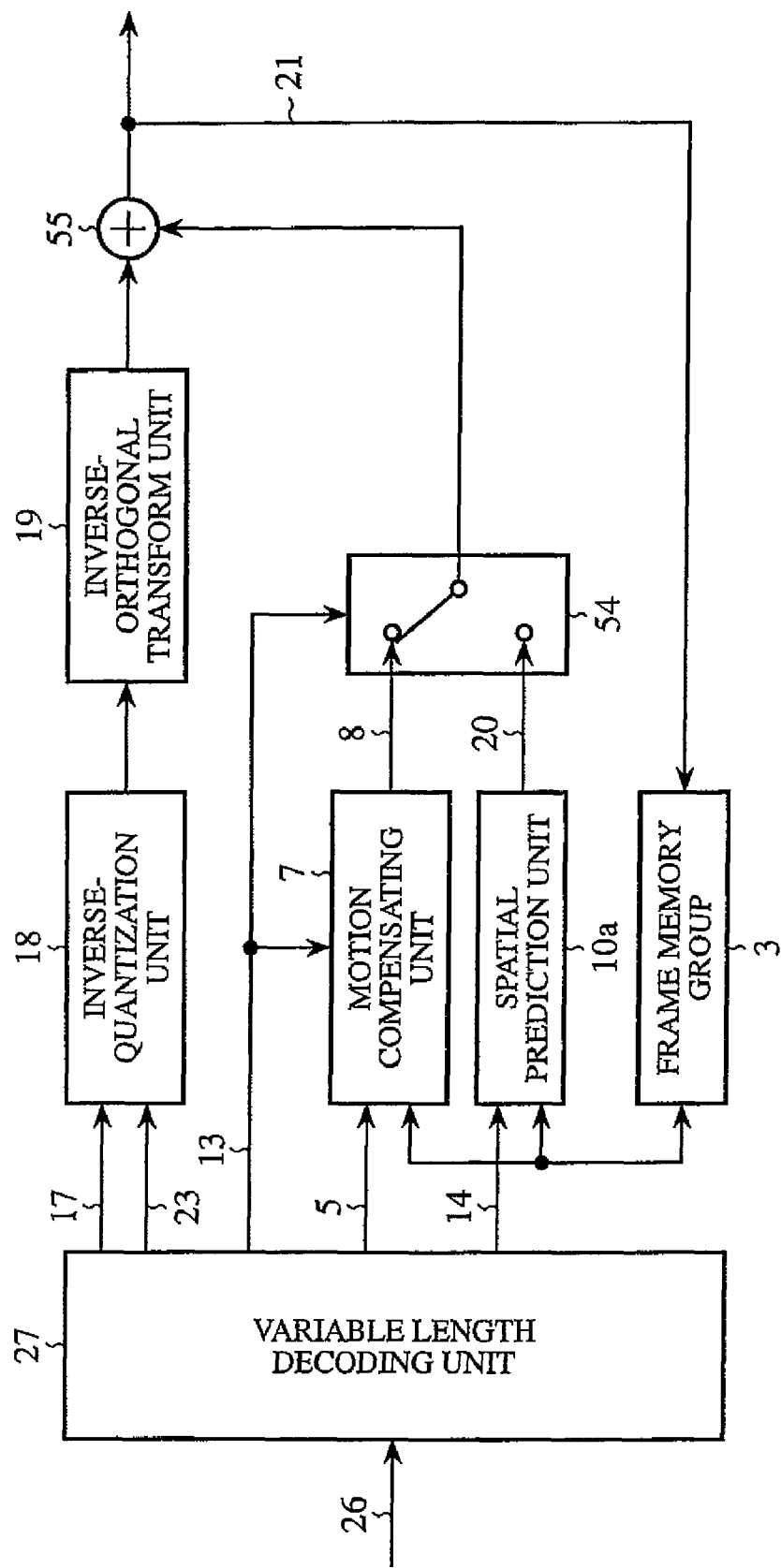
FIG. 17 is a diagram showing the structure of an image decoding apparatus in accordance with embodiment 4.

FIG. 17 shows the structure of the image decoding apparatus according to this embodiment 4 in which the spatial prediction unit 10a is added to the image decoding apparatus according to embodiment 1 as shown in FIG. 4. As shown in FIG. 17, because the image decoding apparatus of this embodiment 4 additionally includes the spatial prediction unit 10a, that is, because the image coding apparatus of this embodiment 4 additionally includes the spatial prediction unit 10a, as shown in FIG. 16, the image decoding apparatus delivers the intra prediction mode information 14 from a variable-length decoding unit 27 to the spatial prediction unit 10a and also delivers a spatially-predicted picture 20, instead of 0, from the spatial prediction unit 10a to a switching unit 54 in the intra mode, unlike the image decoding apparatus according to any one of embodiments 1 to 3. Except for this operation, the image decoding apparatus operates in the same manner as that according to embodiment 1.

Next, a brief explanation of the operation of each of the image coding apparatus and the image decoding apparatus in accordance with embodiment 4 will be made. In the image coding apparatus of this embodiment 4 as shown in FIG. 16, when the spatial prediction unit 10a carries out coding processing in the intra prediction mode, the spatial prediction unit 10a delivers the intra prediction mode information 14 to the variable length coding unit 6, and the variable length coding unit 6 entropy-encodes the information 14 indicating the intra prediction mode as well as a motion vector 5, a quantization step parameter 23, coding mode information 13, and orthogonal transform coefficient data 17 and transmits those coded data as compressed image data 26 by way of a transmission buffer 24. When the coding mode information 13 indicates a motion prediction mode in which a prediction with respect to time is made, the switching unit 52 of this embodiment 4 adds the inverse-quantized and orthogonal-transformed inverse-orthogonal transform coefficient data 17 to a predicted picture 8 from the motion compensating unit 7 according to the coding mode information 13, and delivers the addition result, as a local decoded picture 21, to a frame memory 3. In contrast, when the coding mode information 13 indicates the intra prediction mode in which a prediction with respect to space is made, the switching unit 52 of this embodiment 4 adds the inverse-quantized and orthogonal-transformed inverse-orthogonal transform coefficient data 17 to a spatially-predicted picture 20, and delivers the addition result, as a local decoded picture 21, to the frame memory 3 so as to store it in the frame memory 3 as reference picture data used for motion predictions made on the following frames.

On the other hand, in the image decoding apparatus according to this embodiment 4 shown in FIG. 17, a variable-length decoding unit 27 decodes the intra prediction mode information 14, and delivers it to the spatial prediction unit 10a so as to allow the spatial prediction unit 10a to reconstruct the spatially-predicted picture 20. When the decoded coding mode information 13 from the variable-length decoding unit 27 indicates the motion prediction mode in which a prediction with respect to time is made, a switching unit 54 of this embodiment 4 then delivers the predicted picture 8 from the motion compensating unit 7 to an adder 55 according to the decoded coding mode information 13. In contrast, when the coding mode information 13 indicates the intra prediction mode in which a prediction with respect to space is made, the switching unit 54 delivers the spatially-predicted picture 20 to the adder 55. The adder 55 acquires a decoded picture 21 by adding the output of the switching unit 54 to a decoded signal that is the output of a inverse-orthogonal transform unit 19, and stores the addition result in the frame memory 3 so as to enable either the motion compensating unit 7 or the spatial prediction unit 10a to generate predicted pictures for the following frames.

Thus, because each of the image coding apparatus and the image decoding apparatus according to embodiment 4 uses the intra prediction mode in which each of the image coding apparatus and the image decoding apparatus encodes or decodes each macroblock included in each frame of the differential signal indicating a difference between the moving picture signal and the prediction signal by performing an intraframe spatial prediction, instead of the intra mode which each of the image coding apparatus and the image decoding according to above-mentioned embodiment 1 uses, this embodiment offers an advantage of being able to further improve the compression efficiency as compared with that obtained in the normal intra mode of above-mentioned embodiment 1, as well as the same advantage as provided by above-mentioned embodiment 1.

As previously explained, in accordance with this embodiment 4, the spatial prediction unit 10a is additionally incorporated into both the image coding apparatus according to embodiment 1 as shown in FIG. 3 and the image decoding apparatus according to embodiment 1 as shown in FIG. 4. The present invention is not limited to this case. In other words, the spatial prediction unit 10a can be additionally incorporated into both the image coding apparatus according to embodiment 2 as shown in FIG. 10 and the image decoding apparatus according to embodiment 2 as shown in FIG. 13. Furthermore, the spatial prediction unit 10a can be additionally incorporated into both the image coding apparatus according to embodiment 3 as shown in FIG. 14 and the image decoding apparatus according to embodiment 3 as shown in FIG. 15. In either of these variants, the spatial prediction unit 10a operates in the same manner as mentioned above.

Embodiment 5

In embodiments 1 to 4, the image coding apparatus or the image decoding is explained as an elementary product. In contrast, in this embodiment 5, a final product into which the image coding apparatus or the image decoding apparatus according to any one of embodiments 1 to 4 is incorporated will be briefly explained.

Figure 18:
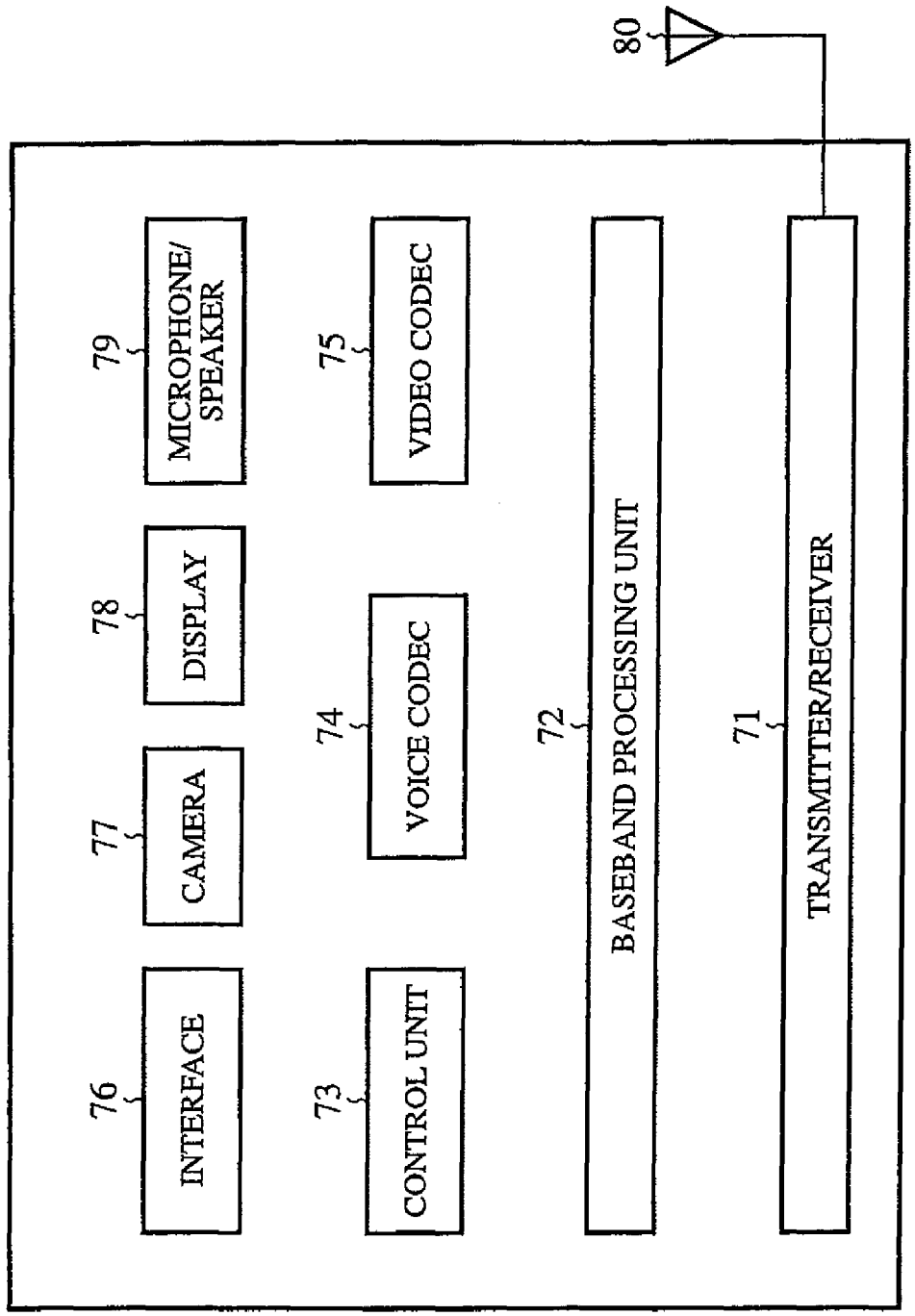
FIG. 18 is a diagram showing the structure of a mobile phone in accordance with embodiment 5 into which the image coding apparatus and the image decoding apparatus according to any one of embodiments 1 to 4 are incorporated as elementary components.

FIG. 18 shows the structure of a mobile phone into which the image coding apparatus and the image decoding apparatus according to any one of embodiments 1 to 4 are incorporated. This mobile phone has a transmitter/receiver 71, a baseband processing unit 72, a control unit 73, a voice codec 74, a video codec 75, an interface 76, a camera 77, a display 78, a microphone/speaker 79, an antenna 80, and so on, as shown in FIG. 18. The image coding apparatus and the image decoding apparatus according to any one of embodiments 1 to 4 are installed as the video codec 75.

Therefore, by mounting both the image coding apparatus and the image decoding apparatus according to any one of embodiments 1 to 4, as elementary components, the mobile phone according to the embodiment 5 can adapt to local movements and carry out compressing and coding with the image quality being maintained at a high level while reducing the memory bandwidth. The present embodiment thus offers a remarkable advantage of being able to simplify the implementation of the image decoding processing and to reduce the electric power consumption because of the reduction in the memory bandwidth.

In this embodiment 5, as the final product into which the image coding apparatus or the image decoding apparatus according to any one of embodiments 1 to 4 are incorporated, the mobile phone into which both the image coding apparatus and the image decoding apparatus are incorporated as the video codec 75 is explained. The application of the present invention is not limited to the mobile phone. The present invention can be also applied to a broadcasting apparatus equipped with only the image coding apparatus according to any one of embodiments 1 to 4, a DVD player equipped with only the image decoding apparatus according to any one of embodiments 1 to 4, and so on, as a matter of course. In a case where the image coding apparatus or the image decoding apparatus according to any one of embodiments 1 to 4 is incorporated into a piece of hardware, such as a player for mainly playing back video images, a mobile phone, or a mobile terminal, the implementation of the image decoding processing can be simplified and the electric power consumption can be reduced because of a reduction in the memory bandwidth.

While the present invention has been illustrated and described in detail with reference to the preferred embodiments thereof, it will be understood by those skilled in the art that various changes in form and details can be made therein without departing from the spirit and scope of the invention defined in the appended claims, and all such changes, replacements and modifications that fall within meets and bounds of the claims are therefore intended to be embraced by the claims.

INDUSTRIAL APPLICABILITY

As mentioned above, a communication apparatus having at least one of the moving image coding apparatus and the image decoding apparatus in accordance with the present invention is suitable for improving the coding efficiency while reducing the memory bandwidth even when dividing each macroblock or each image frame into small regions and performing a motion compensated prediction for each of the small regions.

The invention claimed is:

1. A moving picture decoder restoring a moving picture signal by using an encoded bitstream where a differential signal between a predicted picture generated by performing a motion compensated prediction on a region-by-region basis each being obtained by dividing each frame of the moving picture signal by a predetermined method and the moving picture signal is compression encoded, the decoder comprising:

a frame memory storing a plurality of reference pictures available to generation of the predicted picture;

a decoding unit decoding the differential signal, a motion vector, and a shape information indicating a shape of a block that becomes a unit for the motion compensated prediction by using the encoded bitstream, wherein the shape information indicates an accuracy of virtual pixel and an interpolation filtering method; and a motion compensating unit determining that the accuracy of virtual pixel and the interpolation filtering method is to be used in generating the predicted picture based on the shape of the block that becomes the unit for the motion compensated prediction, and generating the predicted picture containing the virtual pixel with reference to the reference pictures stored in the frame memory using the motion vector decoded by the decoding unit according to a determination result, wherein the decoder restores the motion picture signal by adding the differential signal decoded by the decoding unit and the predicted picture generated by the motion compensating unit.

2. A moving picture decoding method restoring a moving picture signal by using an encoded bitstream where a differential signal between a predicted picture generated by performing a motion compensated prediction on a region-by-region basis each being obtained by dividing each frame of the moving picture signal by a predetermined method and the moving picture signal is compression encoded, the method comprising:

storing a plurality of reference pictures available to generation of the predicted picture;

decoding the differential signal, a motion vector, and a shape information indicating a shape of a block that becomes a unit for the motion compensated prediction by using the encoded bitstream, wherein the shape information indicates an accuracy of virtual pixel and an interpolation filtering method; and determining that the accuracy of virtual pixel and the interpolation filtering method is to be used in generating the predicted picture based on the shape of the block that becomes the unit for the motion compensated prediction, and generating the predicted picture containing the virtual pixel with reference to the reference pictures stored in the frame memory using the decoded motion vector according to a determination result, and restoring the motion picture signal by adding the decoded differential signal and the generated predicted picture.

3. A moving picture encoder compressing input moving picture signal and generating a encoded bitstream where a differential signal between a predicted picture generated by performing a motion compensated prediction on a region-by-region basis each being obtained by dividing each frame of the moving picture signal by predetermined method, the encoder comprising:

a frame memory storing a plurality of reference pictures available to generation of the predicted picture;

a encoding unit encoding the differential signal, a motion vector, and a shape information indicating a shape of block that becomes a unit for motion compensated prediction, wherein the shape information indicates an accuracy of virtual pixel and an interpolation filtering method; and a motion compensated prediction unit determining whether the accuracy of virtual pixel and the interpolation filtering method is to be used in generating the predicted picture based on the shape of block that becomes the unit for motion compensated prediction, and generating the predicted picture containing the virtual pixel with reference to the reference pictures stored in frame memory using the motion vector to be encoded by the encoding unit, wherein the encoder generates the encoded bitstream by subtracting the predicted picture generated by the motion compensated prediction unit to generate the differential signal and compresses it.

4. A moving picture encoding method for compressing input moving picture signal and generating a encoded bitstream where a differential signal between a predicted picture generated by performing a motion compensated prediction on a region-by-region basis each being obtained by dividing each frame of the moving picture signal by predetermined method, comprising:

storing a plurality of reference pictures available to generation of the predicted picture;

encoding the differential signal, a motion vector, and a shape information indicating a shape of block that becomes a unit for motion compensated prediction, wherein the shape information indicates an accuracy of virtual pixel and an interpolation filtering method;

determining whether the accuracy of virtual pixel and the interpolation filtering method is to be used in generating the predicted picture based on the shape of block that becomes the unit for motion compensated prediction;

generating the predicted picture containing the virtual pixel with reference to the reference pictures stored in frame memory using the motion vector to be encoded; and generating the encoded bitstream by subtracting the predicted picture generated by the motion compensated prediction unit to generate the differential signal and compresses it.

* * * * *